United States Patent
Luo et al.

(10) Patent No.: US 11,438,877 B2
(45) Date of Patent: Sep. 6, 2022

(54) SIGNALING FOR SIDELINK BEAM OPERATION

(71) Applicant: QUALCOMM Incorporated, San Diego, CA (US)

(72) Inventors: Tao Luo, San Diego, CA (US); Sony Akkarakaran, Poway, CA (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 16/912,281

(22) Filed: Jun. 25, 2020

(65) Prior Publication Data

US 2020/0413374 A1    Dec. 31, 2020

Related U.S. Application Data

(60) Provisional application No. 62/867,761, filed on Jun. 27, 2019.

(51) Int. Cl.
*H04W 72/02* (2009.01)
*H04W 72/04* (2009.01)
*H04W 24/10* (2009.01)
(Continued)

(52) U.S. Cl.
CPC .......... *H04W 72/02* (2013.01); *H04B 17/318* (2015.01); *H04W 16/28* (2013.01);
(Continued)

(58) Field of Classification Search
CPC ..... H04W 72/02; H04W 16/28; H04W 24/10; H04B 17/318
See application file for complete search history.

(56) References Cited

U.S. PATENT DOCUMENTS

| 10,148,337 B2 | 12/2018 | Ng et al. |
| 10,624,100 B2 | 4/2020 | Chae et al. |

(Continued)

OTHER PUBLICATIONS

Brahmi N., et al., "Deliverable D3.1 Intermediate 5G V2X Radio,"— 5GCAR Version v1.0, May 31, 2018 (May 31, 2018), XP055610151, 121 pages, Internet Retrieved from the Internet: URL: https://5gcar.eu/wp-content/uploads/2018/08/5GCAR_D3.1_v1.0.pdf [retrieved on Jul. 31, 2019] section 3.3.2; p. 46-p. 47.

(Continued)

*Primary Examiner* — Walli Z Butt
*Assistant Examiner* — Ryan C Kavleski
(74) *Attorney, Agent, or Firm* — Holland and Hart LLP

(57) ABSTRACT

Methods, systems, and devices for wireless communications are described. Quasi co-location (QCL) or spatial relation information, or both may be indicated for sidelink communications in a system. For example, a user equipment (UE) may receive control signaling that indicates a resource allocation for a sidelink communication link with another UE. The resource allocation may be configured or scheduled via control messaging from a base station, or may be selected (e.g., by a UE) from a set of resources. The UE may transmit an indication of a QCL relation, spatial relation data, or a combination thereof, to the other UE via a sidelink control channel. The UEs may then communicate over the sidelink communication link using the resource allocation and based on the QCL relation, the spatial relation data, or both.

28 Claims, 15 Drawing Sheets

(51) Int. Cl.
  *H04B 17/318* (2015.01)
  *H04W 16/28* (2009.01)
  *H04W 92/18* (2009.01)

(52) U.S. Cl.
  CPC ......... *H04W 24/10* (2013.01); *H04W 72/046* (2013.01); *H04W 92/18* (2013.01)

(56) References Cited

U.S. PATENT DOCUMENTS

| | | | |
|---|---|---|---|
| 2019/0045569 A1* | 2/2019 | Abedini | H04W 72/0473 |
| 2019/0069285 A1 | 2/2019 | Chandrasekhar et al. | |
| 2019/0089499 A1 | 3/2019 | Nam et al. | |
| 2020/0052843 A1 | 2/2020 | Cheng et al. | |
| 2020/0304253 A1* | 9/2020 | Choi | H04L 5/0023 |
| 2020/0336194 A1* | 10/2020 | Karjalainen | H04W 24/10 |
| 2020/0389883 A1* | 12/2020 | Faxer | H04L 5/0048 |

OTHER PUBLICATIONS

International Search Report and Written Opinion—PCT/US2020/039866—ISA/EPO—dated Sep. 7, 2020 (193448WO).
VIVO: "Enhancements of Uu Link to Control Sidelink", 3GPP Draft, 3GPP TSG RAN WG1 Meeting #95, R1-1812310, Enhancements of UU Link To Control Sidelink, 3rd Generation Partnership Project (3GPP), Mobile Competence Centre, 650, Route Des Lucioles, F-06921, Sophia-Antipolis Cedex, France, vol. RAN WG1, No. Spokane, USA; Nov. 12, 2018-Nov. 16, 2018, Nov. 3, 2018 (Nov. 3, 2018), XP051478499, 5 pages, Retrieved from the Internet: URL:http://www.3gpp.org/ftp/tsg%5Fran/WG1%5FRL1/TSGR1%5F95/Docs/R1%2D1812310%2Ezip [retrieved on Nov. 3, 2018] Section 2.
U.S. Appl. No. 62/867,761, filed Jun. 27, 2019, 98 Pages.

* cited by examiner

SIGNALING FOR SIDELINK BEAM OPERATION

CROSS REFERENCE

The present application for patent claims the benefit of U.S. Provisional Patent Application No. 62/867,761 by Luo et al., entitled "SIGNALING FOR SIDELINK BEAM OPERATION," filed Jun. 27, 2019, assigned to the assignee hereof, and expressly incorporated by reference in its entirety.

FIELD OF TECHNOLOGY

The following relates generally to wireless communications and more specifically to signaling for sidelink beam operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UEs). Some wireless communications systems may support direct communications between multiple communication devices, which may be referred to as sidelink communications. Examples of direct communications may include, but are not limited to, device-to-device (D2D) communications, vehicle-based communications, which may also be referred to as vehicle-to-everything (V2X) networks, vehicle-to-vehicle (V2V) networks, cellular V2X (C-V2X) networks, or the like. As demand for communication efficiency increases, some wireless communications systems may fail to provide satisfactory resource allocation management for sidelink communications.

SUMMARY

The described techniques relate to improved methods, systems, devices, and apparatuses that support signaling for sidelink beam operation. Generally, the described techniques provide for indicating quasi co-location (QCL) and/ or spatial relation information for sidelink communications. For example, a user equipment (UE) may receive control signaling that indicates a resource allocation for a sidelink communication link with another UE. In some examples, the resource allocation may be configured or scheduled via control messaging from a base station, or may be selected (e.g., autonomously by the UE) from a set of resources configured for sidelink communications. In any case, the UE may transmit an indication of a QCL relation, spatial relation data, or any combination thereof, to the other UE via a sidelink control channel. The UEs may then communicate over the sidelink communication link using the resource allocation and based on the QCL relation, the spatial relation data, or both. For instance, the QCL relation or the spatial relation data may indicate the beam(s) that the UEs may use for sidelink communications. In some examples, the QCL relation or spatial relation data used when initially communicating via the sidelink communications link may be indicated by the base station (e.g., via control messaging). However, the UEs may further perform beam refinement procedures to update or modify the QCL relations or spatial relation data to enable continued communications reliability and maintain link quality.

A method of wireless communications by a first UE is described. The method may include receiving control signaling indicating a resource allocation for a sidelink channel, receiving, from a base station, a control message that indicates the QCL relation, the spatial relation data, or both, transmitting, to a second UE via a control channel of the sidelink channel, an indication of a QCL relation, spatial relation data, or both, for the resource allocation, and communicating with the second UE using the resource allocation for the sidelink channel based on the QCL relation, the spatial relation data, or both.

An apparatus for wireless communications by a first UE is described. The apparatus may include a processor, memory coupled with the processor, and instructions stored in the memory. The instructions may be executable by the processor to cause the apparatus to receive control signaling indicating a resource allocation for a sidelink channel, receive, from a base station, a control message that indicates the QCL relation, the spatial relation data, or both, transmit, to a second UE via a control channel of the sidelink channel, an indication of a QCL relation, spatial relation data, or both, for the resource allocation, and communicate with the second UE using the resource allocation for the sidelink channel based on the QCL relation, the spatial relation data, or both.

Another apparatus for wireless communications by a first UE is described. The apparatus may include means for receiving control signaling indicating a resource allocation for a sidelink channel, receiving, from a base station, a control message that indicates the QCL relation, the spatial relation data, or both, transmitting, to a second UE via a control channel of the sidelink channel, an indication of a QCL relation, spatial relation data, or both, for the resource allocation, and communicating with the second UE using the resource allocation for the sidelink channel based on the QCL relation, the spatial relation data, or both.

A non-transitory computer-readable medium storing code for wireless communications by a first UE is described. The code may include instructions executable by a processor to receive control signaling indicating a resource allocation for a sidelink channel, receive, from a base station, a control message that indicates the QCL relation, the spatial relation data, or both, transmit, to a second UE via a control channel of the sidelink channel, an indication of a QCL relation, spatial relation data, or both, for the resource allocation, and communicate with the second UE using the resource allocation for the sidelink channel based on the QCL relation, the spatial relation data, or both.

In some examples of the method, apparatuses, and non-transitory computer-readable medium described herein, communicating with the second UE via the sidelink channel may include operations, features, means, or instructions for transmitting, via a beam corresponding to the QCL relation, a data transmission or a control transmission to the second UE via the sidelink channel.

In some examples of the method, apparatuses, and non-transitory computer-readable medium described herein, communicating with the second UE via the sidelink channel may include operations, features, means, or instructions for receiving, via a beam corresponding to the spatial relation data, a data transmission or a control transmission from the second UE via the sidelink channel.

Some examples of the method, apparatuses, and non-transitory computer-readable medium described herein may further include operations, features, means, or instructions for performing a beam sweep procedure with the second UE via the sidelink channel, transmitting a measurement report to a base station based on the beam sweep procedure, receiving a control message from the base station based on the measurement report, and identifying an updated QCL relation, an updated spatial relation data, or both, based on the control message.

In some examples of the method, apparatuses, and non-transitory computer-readable medium described herein, the measurement report indicates a beam index, a signal strength measurement, or both, for at least one beam measured during the beam sweep procedure.

Some examples of the method, apparatuses, and non-transitory computer-readable medium described herein may further include operations, features, means, or instructions for receiving, from the base station, a set of different QCL relations, where the indication of the QCL relation indicates first QCL relation from the set of different QCL relations.

Some examples of the method, apparatuses, and non-transitory computer-readable medium described herein may further include operations, features, means, or instructions for transmitting, via the control channel, a second indication of a second QCL relation from the set of different QCL relations, and transmitting, via a beam corresponding to the second QCL relation, a data transmission or a control transmission to the second UE via the sidelink channel.

Some examples of the method, apparatuses, and non-transitory computer-readable medium described herein may further include operations, features, means, or instructions for receiving, from the base station, a set of different spatial relation data, where the indication of the spatial relation data indicates first spatial relation data from the set of different spatial relation data.

Some examples of the method, apparatuses, and non-transitory computer-readable medium described herein may further include operations, features, means, or instructions for transmitting, via the control channel, a second indication of second spatial relation data from the set of different spatial relation data, and receiving, via a beam corresponding to the second spatial relation data, a data transmission from the second UE via the sidelink channel.

Some examples of the method, apparatuses, and non-transitory computer-readable medium described herein may further include operations, features, means, or instructions for performing a beam sweep procedure with the second UE via the sidelink channel, and identifying at least one beam based on the beam sweep procedure, where the QCL relation, the spatial relation data, or both, corresponds to the at least one beam.

In some examples of the method, apparatuses, and non-transitory computer-readable medium described herein, the QCL relation indicates an omni beam, a wide beam, a narrow beam, or any combination thereof.

In some examples of the method, apparatuses, and non-transitory computer-readable medium described herein, the spatial relation data indicates an omni beam, a wide beam, a narrow beam, or any combination thereof.

In some examples of the method, apparatuses, and non-transitory computer-readable medium described herein, the resource allocation may be scheduled by a base station or may be a resource pool that may be configured or signaled.

A method of wireless communications by a first UE is described. The method may include receiving control signaling indicating a resource allocation for a sidelink channel, receiving, via a control channel of the sidelink channel, an indication of a network-provided configuration including a QCL relation, spatial relation data, or both, from a second UE for the resource allocation, and communicating with the second UE using the resource allocation for the sidelink channel based on the QCL relation, the spatial relation data, or both.

An apparatus for wireless communications by a first UE is described. The apparatus may include a processor, memory coupled with the processor, and instructions stored in the memory. The instructions may be executable by the processor to cause the apparatus to receive control signaling indicating a resource allocation for a sidelink channel, receive, via a control channel of the sidelink channel, an indication of a network-provided configuration including a QCL relation, spatial relation data, or both, from a second UE for the resource allocation, and communicate with the second UE using the resource allocation for the sidelink channel based on the QCL relation, the spatial relation data, or both.

Another apparatus for wireless communications by a first UE is described. The apparatus may include means for receiving control signaling indicating a resource allocation for a sidelink channel, receiving, via a control channel of the sidelink channel, an indication of a network-provided configuration including a QCL relation, spatial relation data, or both, from a second UE for the resource allocation, and communicating with the second UE using the resource allocation for the sidelink channel based on the QCL relation, the spatial relation data, or both.

A non-transitory computer-readable medium storing code for wireless communications by a first UE is described. The code may include instructions executable by a processor to receive control signaling indicating a resource allocation for a sidelink channel, receive, via a control channel of the sidelink channel, an indication of a network-provided configuration including a QCL relation, spatial relation data, or both, from a second UE for the resource allocation, and communicate with the second UE using the resource allocation for the sidelink channel based on the QCL relation, the spatial relation data, or both.

In some examples of the method, apparatuses, and non-transitory computer-readable medium described herein, communicating with the second UE via the sidelink channel may include operations, features, means, or instructions for receiving, via a beam corresponding to the QCL relation, a data transmission or a control transmission from the second UE via the sidelink channel.

In some examples of the method, apparatuses, and non-transitory computer-readable medium described herein, communicating with the second UE via the sidelink channel may include operations, features, means, or instructions for transmitting, via a beam corresponding to the spatial relation data, a data transmission to the second UE via the sidelink channel based on the spatial relation data.

Some examples of the method, apparatuses, and non-transitory computer-readable medium described herein may further include operations, features, means, or instructions for performing a beam sweep procedure with the second UE via the sidelink channel, and transmitting, to the second UE, a beam index and a beam measurement based on the beam sweep procedure.

Some examples of the method, apparatuses, and non-transitory computer-readable medium described herein may further include operations, features, means, or instructions for performing a beam sweep procedure with the second UE via the sidelink channel, and transmitting a measurement report to a base station based on the beam sweep procedure.

In some examples of the method, apparatuses, and non-transitory computer-readable medium described herein, the measurement report indicates a beam index, a signal strength measurement, or both, for at least one beam measured during the beam sweep procedure.

Some examples of the method, apparatuses, and non-transitory computer-readable medium described herein may further include operations, features, means, or instructions for receiving, via the control channel, a second indication of a second QCL relation, second spatial relation data, or both, and communicating with the second UE via the sidelink channel based on the second QCL relation, the second spatial relation data, or both.

In some examples of the method, apparatuses, and non-transitory computer-readable medium described herein, the QCL relation indicates an omni beam, a wide beam, a narrow beam, or any combination thereof.

In some examples of the method, apparatuses, and non-transitory computer-readable medium described herein, the spatial relation data indicates an omni beam, a wide beam, a narrow beam, or any combination thereof.

A method of wireless communications by a base station is described. The method may include transmitting control signaling indicating a resource allocation for a sidelink channel between a first UE and a second UE and transmitting, to the first UE, a control message including an indication of a QCL relation, spatial relation data, or both, to apply when communicating via the resource allocation for the sidelink channel.

An apparatus for wireless communications by a base station is described. The apparatus may include a processor, memory coupled with the processor, and instructions stored in the memory. The instructions may be executable by the processor to cause the apparatus to transmit control signaling indicating a resource allocation for a sidelink channel between a first UE and a second UE and transmit, to the first UE, a control message including an indication of a QCL relation, spatial relation data, or both, to apply when communicating via the resource allocation for the sidelink channel.

Another apparatus for wireless communications by a base station is described. The apparatus may include means for transmitting control signaling indicating a resource allocation for a sidelink channel between a first UE and a second UE and transmitting, to the first UE, a control message including an indication of a QCL relation, spatial relation data, or both, to apply when communicating via the resource allocation for the sidelink channel.

A non-transitory computer-readable medium storing code for wireless communications by a base station is described. The code may include instructions executable by a processor to transmit control signaling indicating a resource allocation for a sidelink channel between a first UE and a second UE and transmit, to the first UE, a control message including an indication of a QCL relation, spatial relation data, or both, to apply when communicating via the resource allocation for the sidelink channel.

In some examples of the method, apparatuses, and non-transitory computer-readable medium described herein, transmitting the control message may include operations, features, means, or instructions for transmitting the control message including a set of different QCL relations, a set of different spatial relation data, or both.

In some examples of the method, apparatuses, and non-transitory computer-readable medium described herein, identifying the QCL relation, the spatial relation data, or both, for the sidelink channel may include operations, features, means, or instructions for receiving, from the first UE or the second UE, a measurement report, and selecting the QCL relation, the spatial relation data, or both, based on the measurement report.

In some examples of the method, apparatuses, and non-transitory computer-readable medium described herein, the measurement report indicates at least one beam index and at least one beam measurement.

Some examples of the method, apparatuses, and non-transitory computer-readable medium described herein may further include operations, features, means, or instructions for receiving, from the first UE, a first measurement report, receiving, from the second UE, a second measurement report, and selecting the QCL relation, the spatial relation data, or both, based on the first measurement report and the second measurement report.

In some examples of the method, apparatuses, and non-transitory computer-readable medium described herein, the QCL relation indicates an omni beam, a wide beam, a narrow beam, or any combination thereof.

In some examples of the method, apparatuses, and non-transitory computer-readable medium described herein, the spatial relation data indicates an omni beam, a wide beam, a narrow beam, or any combination thereof.

DETAILED DESCRIPTION

Figure 1:
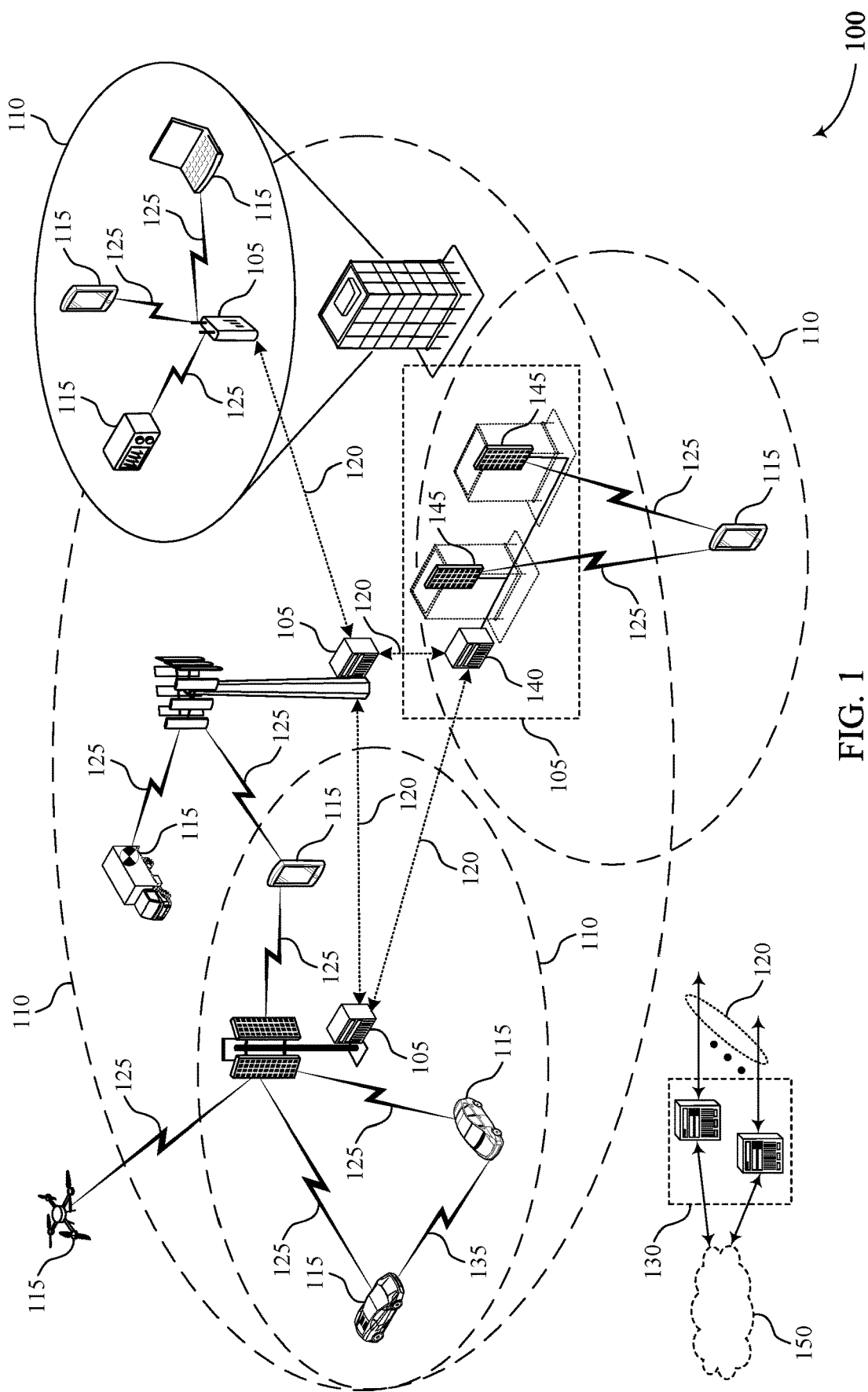
FIG. 1 illustrates an example of a wireless communications system in accordance with aspects of the present disclosure.

Some wireless communications systems may support direct communications between multiple communication devices. Examples of direct communications may include, but are not limited to, device-to-device (D2D) communications, vehicle-based communications, which may also be referred to as vehicle-to-everything (V2X) networks, vehicle-to-vehicle (V2V) networks, cellular V2X (C-V2X) networks, or the like. In some examples, direct communications may be performed via sidelink operations, where a communications link other than an access link (e.g., between a UE and a base station) may be used for communicating data directly between wireless devices. Such systems may further support communications using one or more multiple radio access technologies including fourth generation (4G) systems (such as Long Term Evolution (LTE) systems), fifth generation (5G) systems (which may be referred to as New Radio (NR) systems), and Wi-Fi systems (e.g., wireless local area network (WLAN) systems).

In some cases, a wireless communications system may support communication on various radio frequency spectrum bands (e.g., including FR1 (450 to 6000 MHz), FR2 (24250 to 52600 MHz), and so forth). As such, base stations and UEs may operate in millimeter wave (mmW) frequency ranges, e.g., 28 gigahertz (GHz), 40 GHz, 60 GHz, etc. Wireless communications at these frequencies may be associated with increased signal attenuation (e.g., pathloss), which may be influenced by various factors, such as temperature, barometric pressure, diffraction, blockage, etc. As a result, signal processing techniques, such as beamforming, may be used to coherently combine energy and overcome the pathlosses at these frequencies. Such signal processing techniques may be used for direct communications between two or more wireless devices in the system. However, as demand for communications efficiency increases, improved techniques may be desired for direct communications.

Generally, the techniques described herein provide methods for sidelink beamforming, as well as improvements to resource allocation. In some cases, the described techniques may enable resource allocation for sidelink communication or discovery, or both, which may be performed in different modes of operation. For instance, in a first mode (e.g., a scheduled mode (such as mode-1 sidelink communications, or type-2B sidelink discovery transmission)), the resource allocation for sidelink operations may be scheduled by a base station (e.g., semi-persistently scheduled or aperiodic resource (which may be scheduled by radio resource control (RRC) messaging, a medium access control (MAC)-control element (CE), downlink control information (DCI), or the like)). In a second mode (e.g., an autonomous mode (such as mode-2 sidelink communications or type-1 sidelink discovery transmissions)), a UE may select resources for communicating with another UE from a resource pool, where the resource pool may be pre-configured or signaled via a broadcast channel or through higher layer signaling by the base station. Additionally, signaling of quasi co-location (QCL) or spatial relation information, or both, may enable beamforming for sidelink operations and may indicate which beams to use for beamformed sidelink transmission.

In some examples, a UE may receive control signaling indicating a resource allocation for a sidelink channel. The base station may provide information to the UE related to QCL or spatial relation information, or both, associated with the resource allocation for use on the sidelink channel, which may enable the UE to efficiently communicate over a sidelink communication link based on the QCL information, the spatial relation information, or any combination thereof. As an example, the QCL information may indicate one or more reference signals that may have a QCL relationship (e.g., the antenna ports used for transmitting the reference signals may be quasi co-located (QCLed). In some cases, the UE may perform a beam sweeping procedure to determine the QCL and/or spatial relation information to use for sidelink operations. The UE may then transmit, via a control channel of the sidelink channel, an indication of the QCL relation, the spatial relation data, or both, to another UE, and may communicate with the other UE using the resource allocation for the sidelink channel based on QCL relation, the spatial relation data, or a combination thereof.

Aspects of the subject matter described herein may be implemented to realize one or more advantages. For instance, the described techniques may support improvements in reliability and enhanced coverage through the signaling of beam information for sidelink communications, among other advantages. Aspects of the disclosure are initially described in the context of wireless communications systems. Aspects of the disclosure are further described with reference to a process flow in a system that supports signaling of QCL and spatial relation information for sidelink communications. Aspects of the disclosure are further illustrated by and described with reference to apparatus diagrams, system diagrams, and flowcharts that relate to signaling for sidelink beam operation.

FIG. 1 illustrates an example of a wireless communications system 100 in accordance with aspects of the present disclosure. The wireless communications system 100 may include base stations 105, UEs 115, and a core network 130. In some examples, the wireless communications system 100 may be an LTE network, an LTE-Advanced (LTE-A) network, an LTE-A Pro network, or an NR network. In some cases, the wireless communications system 100 may support enhanced broadband communications, ultra-reliable (e.g., mission critical) communications, low latency communications, communications with low-cost and low-complexity devices, or any combination thereof. The wireless communications system 100 may support techniques for identifying and refining beam information for sidelink communications. As an example, a base station 105 may signal, to one or more UEs 115, an indication of QCL information, spatial relation information, or a combination thereof, which may then be used by the UEs 115 for direct communications with another UE 115. The direct communications may include transmitting and receiving control information and data. over directional (e.g., beamformed) communication links.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 MHz to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, synchronization signal blocks (SSBs) (e.g., including a primary synchronization signal, secondary synchronization signal (SSS), and/or broadcast information (such as a physical broadcast channel (PBCH))), or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, the properties of a signal transmitted using a particular directional beam may be derived from the properties of another signal transmitted over a similar beam. A QCL relationship between one or more transmissions or signals may refer to a spatial relationship between the antenna ports (and the corresponding signaling beams) of the respective transmissions. For example, one or more antenna ports may be implemented by a base station 105 or a UE 115 for transmitting at least one or more reference signals and control information transmissions to a UE 115. However, the channel properties of the signals sent via the different antenna ports may be interpreted (e.g., by a receiving device) to be the same (e.g., despite the signals being transmitted from different antenna ports), and the antenna ports (and the respective beams) may be determined to be QCLed. In such cases, the UE 115-b may have respective antenna ports for receive beams used for receiving the QCLed transmissions (e.g., the reference signal). In some cases, QCLed signals may enable the UE 115 to derive the properties of a first signal (e.g., delay spread, Doppler spread, frequency shift, average power, spatial receive filter (which may also be referred to as receive beamforming)) transmitted via a first antenna port from measurements made on a second signal transmitted via a second antenna port.

In some examples, different types of QCL relationships may describe the relation between two different signals or antenna ports. For instance, QCL-TypeA may refer to a QCL relationship between signals including Doppler shift, Doppler spread, average delay, and delay spread. QCL-TypeB may refer to a QCL relationship including Doppler shift and Doppler spread, whereas QCL-TypeC may refer to a QCL relationship including Doppler shift and average delay. A QCL-TypeD may refer to a QCL relationship of spatial parameters, which may indicate a relation between two or more directional beams used to communicate signals. Here, the spatial parameters may indicate that a first beam used to transmit a first signal may be similar (or the same) as another beam used to transmit a second, different, signal, or that a first receive beam used to receive a first signal may be similar (or the same) as another beam used to receive a second signal. More specifically, a QCL-TypeD may relate to a spatial receive beam, and if two signals are transmitted with a same beam, they may be receivable using a same receive beam (and the signals/antenna ports may be defined as QCL TypeD). Some analogous terminology for some QCL types, such as QCL TypeD, may include spatial relation information (e.g., for uplink transmissions). As such, it is understood that the term "QCL relation information" may also include spatial relation information, and vice versa. Thus, the beam information for various beams may be derived through receiving signals from a transmitting device, where, in some cases, the QCL information or spatial relation information may help a receiving device efficient identify communications beams (e.g., without having to sweep through a large number of beams to identify a beam (e.g., the beam having a highest signal quality compared to other beams)).

In some examples, QCL relation information or spatial relation information (such as different QCL types) may be indicated through signaling from another wireless device (e.g., a base station 105 or UE 115). For instance, a UE 115 may be configured with one or more transmission configuration indication (TCI) states, where a TCI state may indicate a particular QCL relation for one or more signals. In some examples, TCI state information may be signaled to a UE 115 via higher layer signaling (e.g., via an RRC information element or other configuration signaling). Additionally or alternatively, and as described herein, QCL relation information may be signaled between respective UEs 115 using a sidelink control channel. As such, the UEs 115 may identify QCL information to use for sidelink communications with another UE 115.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support the indication of QCL and/or spatial relation information for sidelink communications. For example, a UE 115 may receive control signaling that indicates a resource allocation for a sidelink communication link with another UE 115. In some examples, the resource allocation may be configured or scheduled via control messaging from a base station 105, or may be selected (e.g., autonomously by the UE 115) from a set of resources configured for sidelink communications. The UE 115 may transmit an indication of a QCL relation, spatial relation data, or a combination thereof, to the other UE 115 via a sidelink control channel. The UEs 115 may then communicate over the sidelink communication link using the resource allocation and based on the QCL relation, the spatial relation data, or both. For example, the QCL relation or the spatial relation data may indicate the beam(s) that the UEs 115 may use for sidelink communications. In some examples, the QCL relation or spatial relation data used when initially communicating via the sidelink communications link may be indicated by the base station 105 (e.g., via control signaling). However, the UEs 115 may further perform beam refinement procedures to update or modify the QCL relations or spatial relation data to enable continued communications reliability and maintain link quality.

Figure 2:
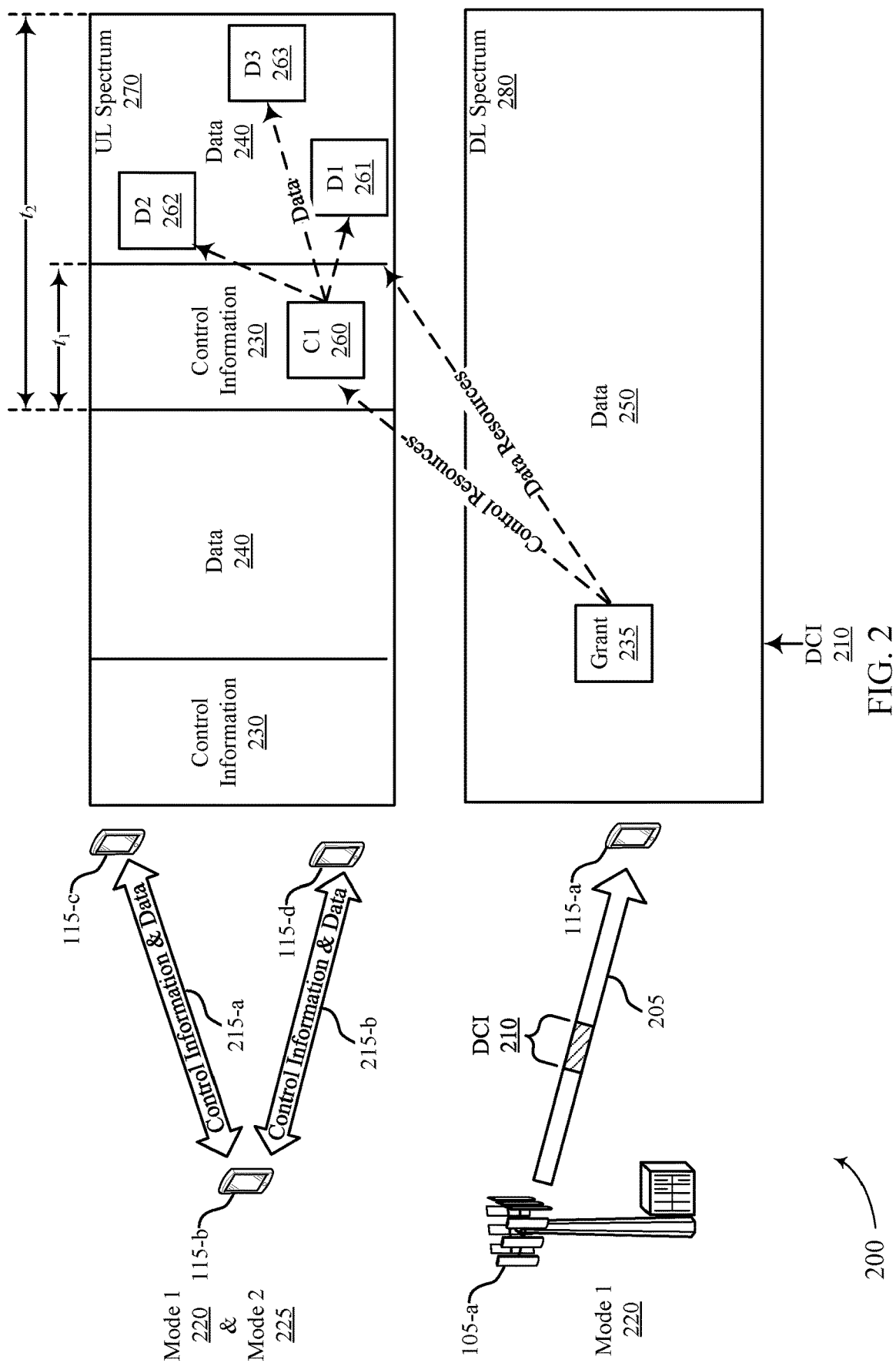
FIG. 2 illustrates an example of a wireless communications system in accordance with aspects of the present disclosure.

FIG. 2 illustrates an example of a wireless communications system 200 in accordance with aspects of the present disclosure. In some examples, the wireless communications system 200 may implement aspects of the wireless communications system 100. For example, the wireless communications system 200 may include a base station 105-a and multiple UEs 115 (e.g., UEs 115-a through 115-d), which may be examples of the corresponding devices described with reference to FIG. 1. UEs 115 in the wireless communications system 200 may support sidelink communications using directional (e.g., beamformed) transmissions. Wireless communications system 200 may also support the management of sidelink resources by receiving control signaling indicating resources available for sidelink communication and discovery. In some examples, the signaling of QCL information for multi-beam sidelink communications may support semi-persistent scheduling for wireless communications within wireless communications system 200.

In wireless communications system 200, base station 105-a may communicate with one or more UEs 115 over an access link 205. In some examples, the access link 205 may be an example of a communication link 125 described with reference to FIG. 1, and may correspond to a radio interface (e.g., a Uu interface) between a UE 115 and a radio access network. Base station 105-a may transmit control information (e.g., including DCI 210) and data on the downlink to UE 115-a over access link 205. Likewise, UE 115-a may communicate control information and data to base station 105-a on the uplink using access link 205. In some examples, access link 205 may be a directional link (e.g., beamformed) between base station 105-a and UE 115-a.

Additionally, a UE 115 may utilize one or more sidelink communication links 215 (e.g., a sidelink channel between two wireless devices) to communicate with another UE 115. A sidelink communication link 215 may be an example of a communication link 135 described with reference to FIG. 1. In some cases, a UE 115 may be capable of communicating with one or multiple other devices using respective sidelink communication links 215. As an example, UE 115-b may communicate with UE 115-c using a first sidelink communication link 215-a, and may also communicate with UE 115-d using a second sidelink communication link 215-b. The UEs 115 that communicate over a sidelink communication link 215 may accordingly transmit control information 230 (e.g., sidelink control information (SCI)) and data 240 over the sidelink channel. In some examples, the sidelink communication link(s) 215 may correspond to a radio interface between two devices that may be independent from a network (such as a PC5 or V2X interface). As described herein, each sidelink communication link 215 may be a directional link between devices, for example, formed using beamforming techniques (such as with mmW communications).

As illustrated in FIG. 2, control information 230 and data may be communicated by each UE 115 over a sidelink communication link 215, which may be transmitted using time/frequency resources in uplink spectrum 270. In some cases, control resources (e.g., control element C1 260) and respective data resources (e.g., data elements D1 261, D2 262, and D3 263) in the uplink spectrum 270 may be used for communications over the sidelink communication link 215. In some cases, resources in the uplink spectrum 270 may be optionally configured or scheduled by base station 105-a. For instance, base station 105-a may transmit a downlink scheduling grant 235 and data 250 via downlink spectrum 280, where the downlink scheduling grant 235 may include an indication of control resources and data resources that may be used by one or more UEs 115 (e.g., for sidelink communications). In other cases, the resources used to transmit the control information 230 and data may be determined from a set of resources configured for sidelink communications. In some cases, the resources used for control information 230 and data 240 in uplink spectrum 270 may span different time periods (or symbol periods). As an illustrative example, the resources used for control information 230 may include a first time period, $t_1$ (e.g., 4 ms), whereas the resources used for both the control information 230 and data 240 may include a second time period, $t_2$, that is greater than the first time period (e.g., 160 ms).

Sidelink communications in wireless communications system 200 may be performed by various UEs 115 using different sidelink modes (e.g., using a first sidelink mode 220, a second sidelink mode 225, or a combination thereof). As an example, the first sidelink mode 220 may be an example of a scheduled mode, where base station 105-a may indicate to one or more UEs 115 which resources may be utilized for sidelink communications. A transmitting UE 115 (e.g., UE 115-a) may receive information about an allocated beam from base station 105-a in accordance with the first sidelink mode 220.

The second sidelink mode 225 may be an example of an autonomous mode, where a UE 115 may determine which resources to use for a sidelink channel. In such cases, the resources may be selected, for example, from a set of preconfigured sidelink resources. Here, a UE 115 (e.g., UE 115-b, 115-c, and/or 115-d) may autonomously determine which transmission beam to utilize in the second sidelink mode 225. In some cases, a receiving UE 115 (e.g., UEs 115-b, 115-c, or 115-d) may receive data or control information via a beam indicated via a controlling base station 105-a (e.g., in the first sidelink mode 220) or by a transmitting UE 115-a (e.g., in the second sidelink mode 225), or a combination thereof.

As described herein, one or more UEs 115 may communicate QCL and/or spatial relation information to other UEs 115 in the wireless communications systems 200 by exchanging information, for example, via control information 230 and data 240 and over a sidelink communication link 215. Further, resource allocations for communication and/or discovery in sidelink operation may be configured by base station 105-a using control channel signaling. The signaling of QCL information may enable multi-beam operations for sidelink communications in wireless communications system 200. For example, QCL information may be signaled by the base station 105-a to the UEs 115 (e.g., for sidelink operations) through control information 230, a MAC-CE, or a combination thereof. Additionally, a UE 115 may identify the QCL information, and may signal the QCL information to other UEs 115 via a sidelink communication link 215.

Base station 105-a may configure a set of resources that UE 115-a may use for communications based on a measurement report from one or more UEs 115. As an example, UE 115-b and UE 115-c may perform a beam sweeping operation and perform beam measurements on received signals (e.g., a received discovery signal, reference signal, or other signals transmitted by a UE 115 over the sidelink communication link 215). In some examples, the measurements may identify a beam index, a signal strength measurement (e.g., RSRP), or the like, for various beams used during the beam sweeping operation. UE 115-b or UE 115-c, or both, may transmit a measurement report to base station 105-a, which may include beam information for one or more UEs 115 (e.g., including UEs 115-b, 115-c, etc.). The measurement report may be transmitted by either UE 115-b or UE 115-c, which may be based on which UE 115 is sweeping a transmit beam and which UE 115 is measuring.

Based on the received measurement report(s), base station 105-a may configure a set of QCL relations, spatial relation data, or any combination thereof, which may be used by UE 115-b and UE 115-c for sidelink communications over a sidelink channel. For example, base station 105-a may communicate a TCI state to UE 115-a. The TCI state may be used to indicate one of a number of different QCL types (e.g., typeA, typeB, typeC, typeD), where the QCL information may include one or multiple reference signals that serve as a QCL source. For instance, each reference signal from a transmitting device may serve as a source for one or multiple types of QCL relationships. The TCI state may be an encapsulation of the different QCL relations. In some cases, a TCI state may be reconfigured, in which case a receive beam may be modified and the QCL parameters may also be modified.

In some cases, the QCL information configured by base station 105-a may be communicated between the UEs 115. For example, UE 115-b may receive an indication of the QCL information from base station 105-a, and then communicate the QCL information to UE 115-c or 115-d via sidelink communication link 215-a or 215-b, respectively. In such cases, UE 115-b may indicate the network-provided QCL information or network-provided spatial relation data, or both, via control information 230, and may thereafter communicate data 240 based, at least in part, on the QCL relation, the spatial relation data, or any combination thereof, included in the control information.

While the QCL information indicated by base station 105-a may serve as an initial set of QCL or spatial relation parameters for sidelink communications, one or more UEs 115 may modify, overwrite, or otherwise adjust the QCL information. As an example, UE 115-b and UE 115-c may perform beam refinement or other beam management procedures. Based on these beam management procedures, UE 115-b and UE 115-c may identify one or more different QCL relations that may provide for more efficient communications (e.g., as compared to the initial QCL relation information from base station 105-a). As such, UE 115-b and UE 115-c may continue to communicate using modified QCL relation information over the sidelink channel.

The QCL relation or spatial relation data indicated by base station 105-a (e.g., as part of an initial indication of QCL information) may use signals transmitted on access link 205 (e.g., uplink, downlink) as a reference for the QCL relation or spatial relation indication. While the indicated information may be well-suited for the access link 205, the information, in some cases, may relatively less well-suited for sidelink communications (e.g., over sidelink communications link(s) 215) and may be subject to further refinement. However, the reference signals transmitted on the access link 205 may provide a useful initial QCL reference. For example, for an SSB transmitted via the access link 205 with a broad beam (e.g., intended for UEs 115 near the base station 105-a), a broad beam sidelink transmission may be indicated. Other initial indications may also be possible if base station 105-a has information about the UE(s) 115 (e.g., position and/or orientation of the UEs 115) that may be attempting to connect via a sidelink operation. In this case, attributes of the initial transmission and/or the receive beam may be indicated explicitly rather than indirectly specifying the attributes via QCL or spatial relation data. For example, attributes that may be indicated include a geographic pointing direction (e.g., a direction of peak gain) of the beam, beam-width, or the like.

Base station 105-a may further provide initial QCL or spatial relation data with additional information on sidelink measurements of signal quality (e.g., RSRP) from one or more of the UEs 115 based on the time at which the UEs 115 connected via a sidelink communication link 215. Initial QCL or spatial relations may be further supplemented with information about the sidelink with indications from the UEs 115 to base station 105-a including information about the relevance of previous measurements. Such indications may be based on a parameter indicating UE mobility, rate of change of orientation, or the like. In a similar manner, base station 105-a may provide refined QCL relations and may serve as a relay between two UE 115 (such as UE 115-b and UE 115-c), which may provide an additional or alternative scheme to the examples in which the UEs 115 exchange refined QCL or spatial indications directly over the sidelink and report the sidelink signal quality measurements to base station 105-a, as described herein.

It should also be noted that the techniques described herein may be extended to cases in which there may be two or more UEs 115, one or more base stations 105, or any combination thereof. For example, if two UE 115 are able to connect via a sidelink communication link 215, the role served by the base station 105 may be implemented by a network. This network may include, for example, a direct link (e.g., an X2 or Xn link) between base stations 105 or a common network node (such as an MME or AMF) serving the base stations 105. In another example, the network may include elements of two different public land mobile networks (PLMNs) with respective base stations 105, including elements providing proximity services functions (e.g., ProSe functions) and interfaces (such as PC1, PC2, PC3, PC4a, PC4b, PC6) that connect these elements. QCL or spatial relations may be provided by the network, and may be localized in different functional entities of this network. For example, an MME, AMF, or ProSe function may designate one of the base stations 105 as a "master" base station 105 and another base station 105 as a "relay" base station 105. The relay base station 105, together with the rest of the network, may convey information that, in other cases, may have been provided by UEs 115 to the master base station 105.

Figure 3:
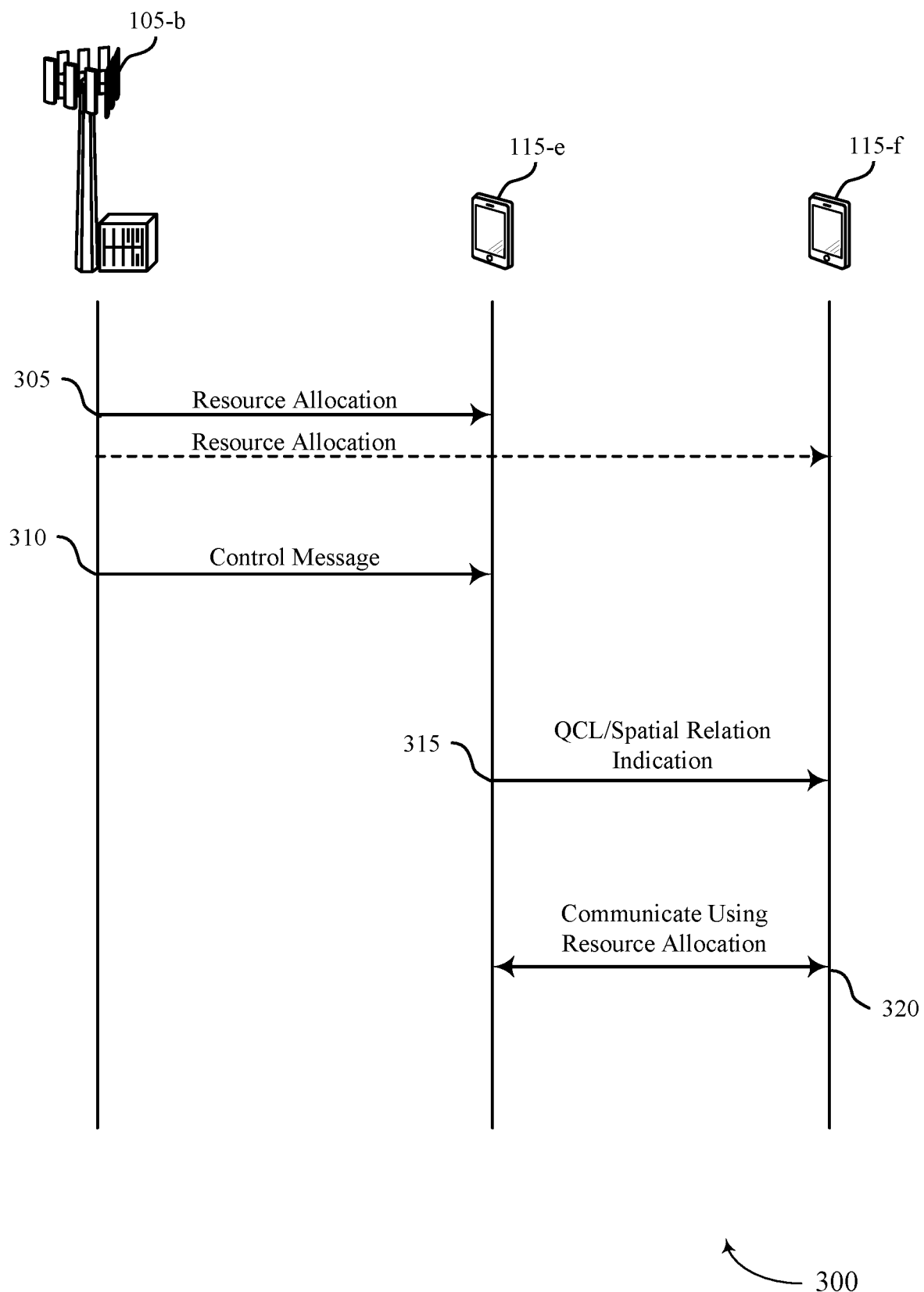
FIG. 3 illustrates an example of a process flow in a system in accordance with aspects of the present disclosure.

FIG. 3 illustrates an example of a process flow 300 in a system in accordance with aspects of the present disclosure. In some examples, process flow 300 may implement aspects of wireless communications systems 100 and 200. Process flow 300 includes UE 115-e, UE 115-f, and base station 105-b, which may be examples of UEs 115 and a base station 105 described with reference to FIGS. 1 and 2. In the following description of the process flow 300, the operations performed by base station 105-b and UEs 115-e, 115-f may be performed in different orders or at different times. Some operations may also be left out of the process flow 300, or other operations may be added to the process flow 300. While base station 105-b and UE 115-e, and UE 115-f are shown performing a number of the operations of process flow 300, any wireless device may perform the operations shown or described. Process flow 300 may illustrate the signaling of QCL information for use in sidelink communications.

At 305, base station 105-b may transmit control signaling to UE 115-e that may indicate a resource allocation for a sidelink channel. In some examples, the resource allocation may be preconfigured and/or signaled via a broadcast channel, via a groupcast, or through higher layer signaling by base station 105-b. As such, the resource allocation may also be indicated to UE 115-f by base station 105-b. In some cases, the resource allocation may be scheduled or configured by base station 105-b (e.g., in accordance with a scheduled mode of operations). In other examples, the resource allocation may be indicated as a set or pool of resources configured for sidelink communications, and UE 115-e may identify a particular resource allocation from the set (e.g., in accordance with an autonomous mode of operations).

At 310, base station 105-b may transmit, to UE 115-e, a control message including an indication of a QCL relation, spatial relation data, or both, to apply when communicating via the resource allocation for a sidelink channel. The control message may be signaled via a control channel, a MAC-CE, or the like.

At 315, UE 115-e may transmit, and UE 115-f may receive, an indication of the QCL relation, spatial relation data, or both. The indication may be communicated between the UEs 115 via a control channel of the sidelink channel. The QCL or spatial relation data may include one or multiple reference signals that may serve as a QCL source for one or multiple types of QCL (e.g., including typeA, typeB, typeC, typeD, etc.). In some examples, the QCL relation indicates an omni beam, a wide beam, a narrow beam, or a combination thereof. Additionally or alternatively, the spatial relation data indicates an omni beam, a wide beam, a narrow beam, or a combination thereof. In some cases, though the signaling of the QCL information via the sidelink channel, UE 115-e and UE 115-f may communicate using the directional beams (and antenna ports) as indicated by the QCL information conveyed by UE 115-e (and initially by base station 105-b).

As such, at 320, UE 115-e and UE 115-f may communicate using the resource allocation for the sidelink channel based on the QCL relation, the spatial relation data, or both. The QCL relation or spatial data may serve as an initial QCL for the sidelink communications and may be refined or written over by UEs 115-e and UE 115-f. For example, UE 115-e and UE 115-f may further identify changes and adjustments to the signaled QCL information for continued sidelink communications.

Figure 4:
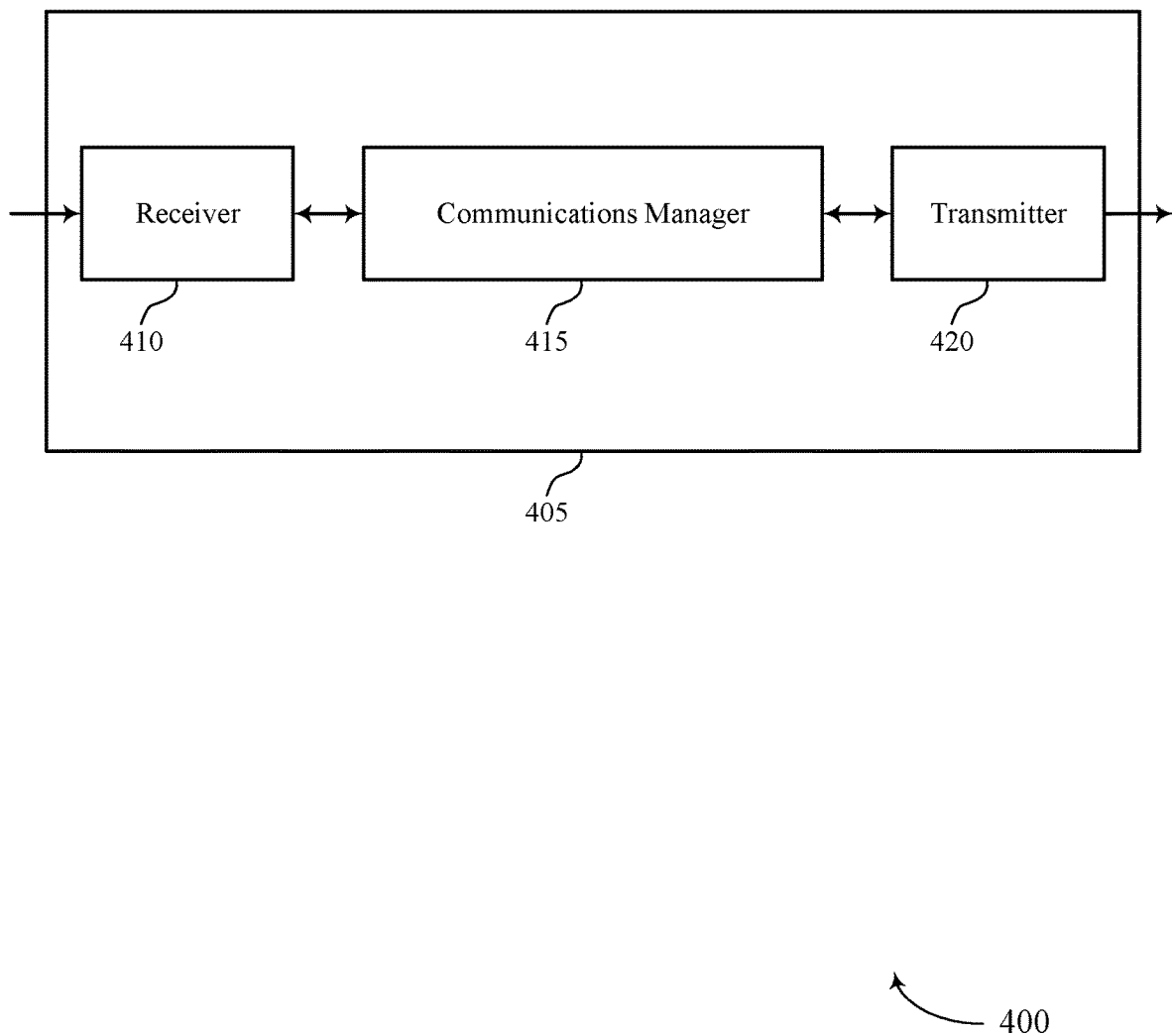
FIGS. 4 and 5 show block diagrams of devices in accordance with aspects of the present disclosure.

FIG. 4 shows a block diagram 400 of a device 405 in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., sidelink channels, control channels, data channels, and information related to sidelink beam operations, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive control signaling indicating a resource allocation for a sidelink channel, receive, from a base station, a control message that indicates the QCL relation, the spatial relation data, or both, transmit, to a second UE via a control channel of the sidelink channel, an indication of a QCL relation, spatial relation data, or both, for the resource allocation, and communicate with the second UE using the resource allocation for the sidelink channel based on the QCL relation, the spatial relation data, or both. In some examples, the communications manager 415 may also receive control signaling indicating a resource allocation for a sidelink channel, receive, via a control channel of the sidelink channel, an indication of a network-provided configuration including a QCL relation, spatial relation data, or both, from a second UE for the resource allocation, and communicate with the second UE using the resource allocation for the sidelink channel based on the QCL relation, the spatial relation data, or both. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

The actions performed by the communications manager 415 as described herein may be implemented to realize one or more potential advantages. One implementation may allow a UE 115 to quickly and efficiently communicate with another UE 115 via a sidelink channel. For example, a UE 115 may utilize resources indicated or preconfigured by a base station 105 to communicate using beamforming techniques. Additionally, QCL information provided by the base station 105 may enable multi-beam operations for sidelink communications on those resources. Using this information, the UE 115 may save time and power resources by communicating via beamforming transmissions indicated through exchanging QCL information between device on a sidelink channel.

Figure 5:
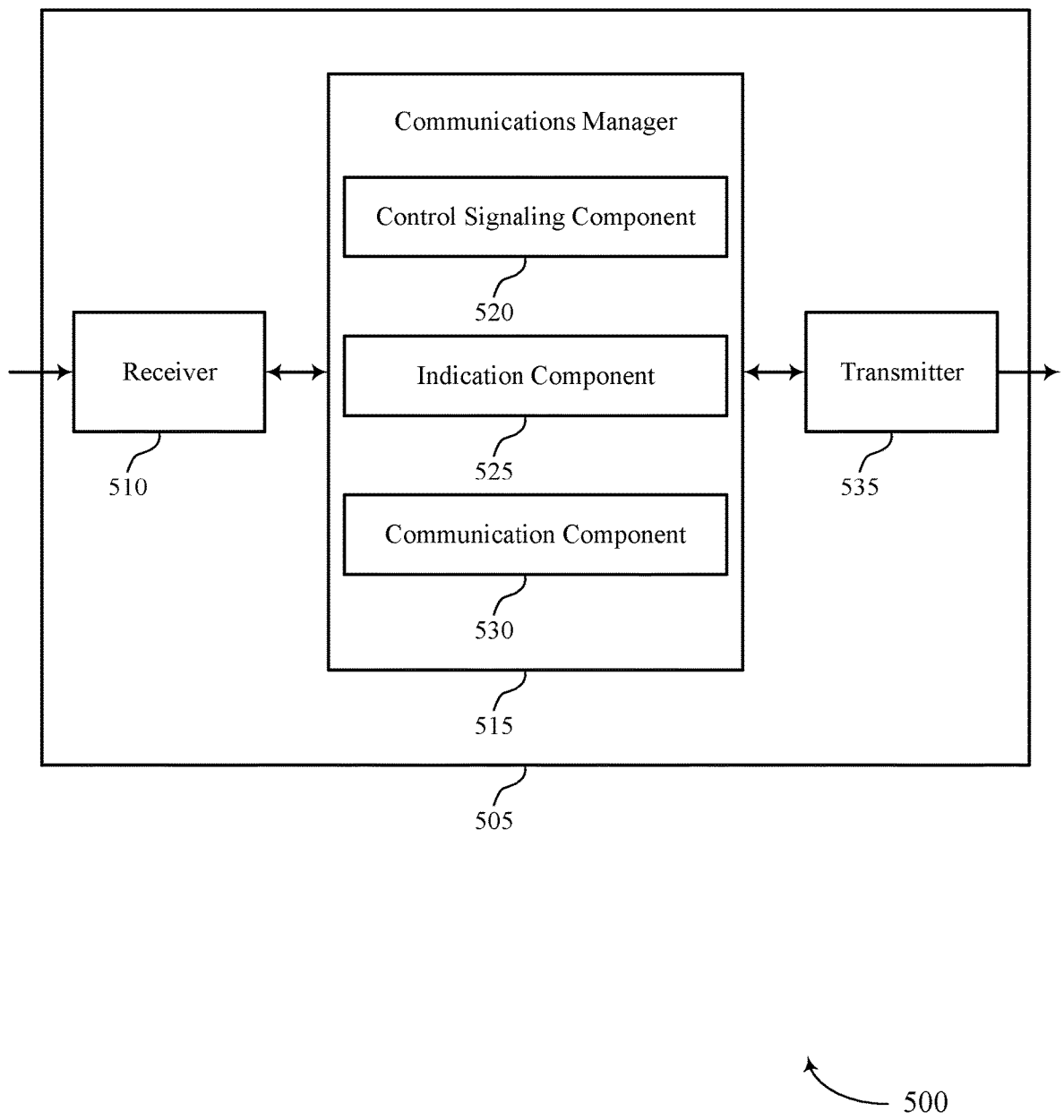

FIG. 5 shows a block diagram 500 of a device 505 in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to wireless communication systems, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a control signaling component 520, an indication component 525, and a communication component 530. The communications manager 515 may be an example of aspects of the communications manager 710 described herein.

The control signaling component 520 may receive control signaling indicating a resource allocation for a sidelink channel. The control signaling component 520 may receive, from a base station, a control message that indicates the QCL relation, the spatial relation data, or both. The indication component 525 may transmit, to a second UE via a control channel of the sidelink channel, an indication of a QCL relation, spatial relation data, or both, for the resource allocation. The communication component 530 may communicate with the second UE using the resource allocation for the sidelink channel based on the QCL relation, the spatial relation data, or both.

The control signaling component 520 may receive control signaling indicating a resource allocation for a sidelink channel. The indication component 525 may receive, via a control channel of the sidelink channel, an indication of a network-provided configuration including a QCL relation, spatial relation data, or both, from a second UE for the resource allocation. The communication component 530 may communicate with the second UE using the resource allocation for the sidelink channel based on the QCL relation, the spatial relation data, or both.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Based on beam information from one or multiple devices, a processor of a UE 115 (e.g., controlling the receiver 510, the transmitter 535, or the transceiver 720 as described with reference to FIG. 7) may efficiently determine a set of QCL parameters for resource allocation. Further, the processor of UE 115 may transmit QCL information to other UE 115. The processor of the UE 115 may turn on one or more processing units for receiving the QCL information, enabling beamformed transmissions via a sidelink channel, or a similar mechanism within the UE 115. As such, when the QCL information is received, the processor may be ready to communicate more efficiently through the a priori information regarding the allocated resources and QCL information.

Figure 6:
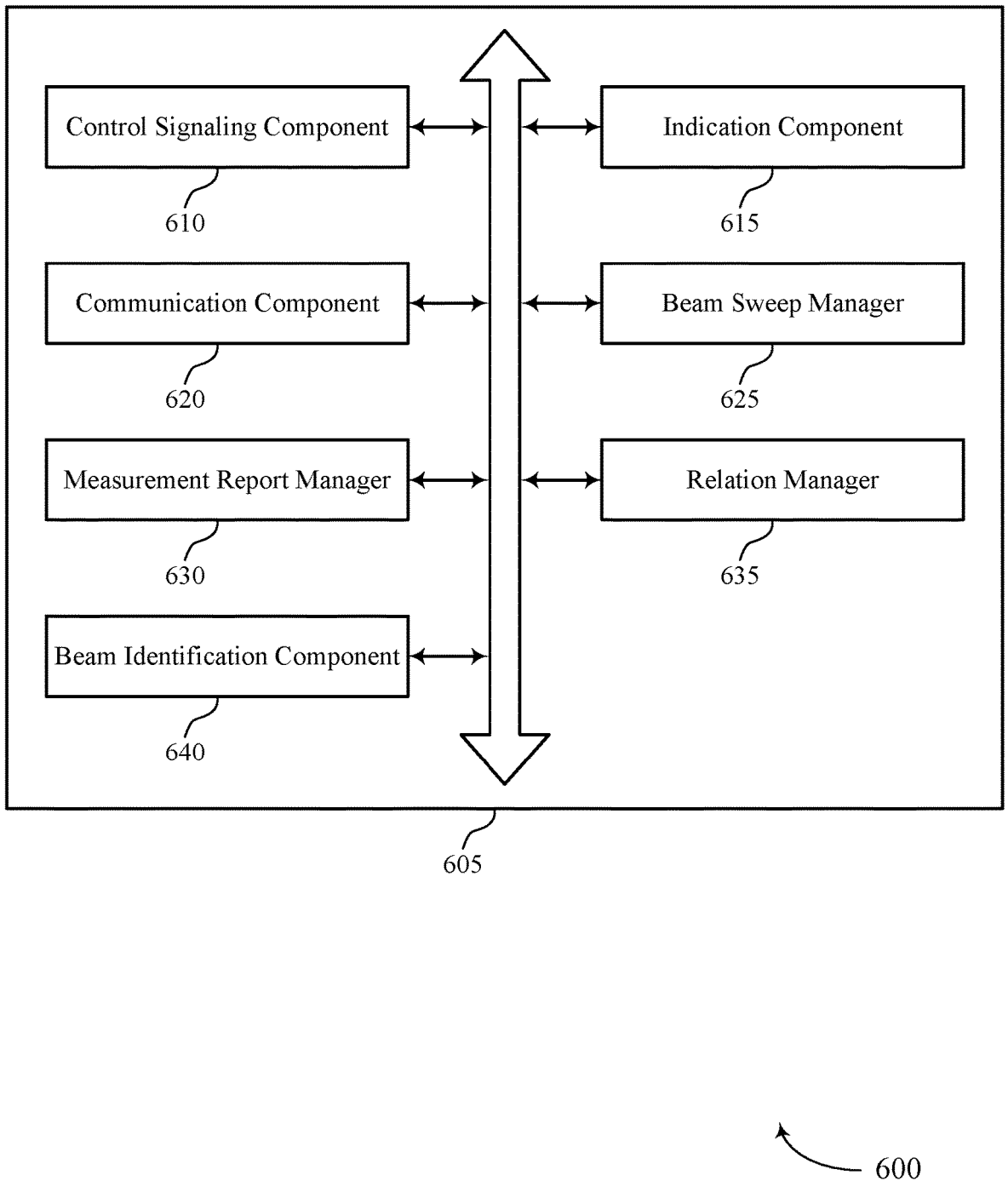
FIG. 6 shows a block diagram of a communications manager in accordance with aspects of the present disclosure.

FIG. 6 shows a block diagram 600 of a communications manager 605 in accordance with aspects of the present disclosure. The communications manager 605 may be an example of aspects of a communications manager 415, a communications manager 515, or a communications manager 710 described herein. The communications manager 605 may include a control signaling component 610, an indication component 615, a communication component 620, a beam sweep manager 625, a measurement report manager 630, a relation manager 635, and a beam identification component 640. Each of these modules may communicate, directly or indirectly, with one another (e.g., via one or more buses).

The control signaling component 610 may receive control signaling indicating a resource allocation for a sidelink channel. In some examples, the control signaling component 610 may receive, from a base station, a control message that indicates the QCL relation, the spatial relation data, or both.

In some examples, the control signaling component 610 may receive a control message from the base station based on the measurement report. In some examples, the control signaling component 610 may transmit, via the control channel, a second indication of a second QCL relation from the set of different QCL relations. In some examples, the control signaling component 610 may transmit, via the control channel, a second indication of second spatial relation data from the set of different spatial relation data. In some cases, the resource allocation is scheduled by a base station or is a resource pool that is configured or signaled.

The indication component 615 may transmit, to a second UE via a control channel of the sidelink channel, an indication of a QCL relation, spatial relation data, or both, for the resource allocation. In some examples, the indication component 615 may receive, via a control channel of the sidelink channel, an indication of a QCL relation, spatial relation data, or both, from a second UE for the resource allocation. In some examples, the indication component 615 may receive, via the control channel, a second indication of a second QCL relation, second spatial relation data, or both.

In some cases, the QCL relation indicates an omni beam, a wide beam, a narrow beam, or any combination thereof. In some cases, the spatial relation data indicates an omni beam, a wide beam, a narrow beam, or any combination thereof. In some cases, the QCL relation indicates an omni beam, a wide beam, a narrow beam, or any combination thereof. In some cases, the spatial relation data indicates an omni beam, a wide beam, a narrow beam, or any combination thereof.

The communication component 620 may communicate with the second UE using the resource allocation for the sidelink channel based on the QCL relation, the spatial relation data, or both. In some examples, the communication component 620 may communicate with the second UE using the resource allocation for the sidelink channel based on the QCL relation, the spatial relation data, or both. In some examples, the communication component 620 may transmit, via a beam corresponding to the QCL relation, a data transmission or a control transmission to the second UE via the sidelink channel.

In some examples, the communication component 620 may receive, via a beam corresponding to the spatial relation data, a data transmission or a control transmission from the second UE via the sidelink channel. In some examples, the communication component 620 may transmit, via a beam corresponding to the second QCL relation, a data transmission or a control transmission to the second UE via the sidelink channel. In some examples, the communication component 620 may receive, via a beam corresponding to the second spatial relation data, a data transmission from the second UE via the sidelink channel.

In some examples, the communication component 620 may receive, via a beam corresponding to the QCL relation, a data transmission or a control transmission from the second UE via the sidelink channel. In some examples, the communication component 620 may transmit, via a beam corresponding to the spatial relation data, a data transmission to the second UE via the sidelink channel based on the spatial relation data. In some examples, the communication component 620 may communicate with the second UE via the sidelink channel based on the second QCL relation, the second spatial relation data, or both.

The beam sweep manager 625 may perform a beam sweep procedure with the second UE via the sidelink channel. In some examples, the beam sweep manager 625 may transmit, to the second UE, a beam index and a beam measurement based on the beam sweep procedure.

The measurement report manager 630 may transmit a measurement report to a base station based on the beam sweep procedure. In some examples, the measurement report manager 630 may transmit a measurement report to a base station based on the beam sweep procedure. In some cases, the measurement report indicates a beam index, a signal strength measurement, or both, for at least one beam measured during the beam sweep procedure. In some cases, the measurement report indicates a beam index, a signal strength measurement, or both, for at least one beam measured during the beam sweep procedure.

The relation manager 635 may identify an updated QCL relation, an updated spatial relation data, or both, based on the control message. In some examples, the relation manager 635 may receive, from the base station, a set of different QCL relations, where the indication of the QCL relation indicates first QCL relation from the set of different QCL relations. In some examples, the relation manager 635 may receive, from the base station, a set of different spatial relation data, where the indication of the spatial relation data indicates first spatial relation data from the set of different spatial relation data.

The beam identification component 640 may identify at least one beam based on the beam sweep procedure, where the QCL relation, the spatial relation data, or both, corresponds to the at least one beam.

Figure 7:
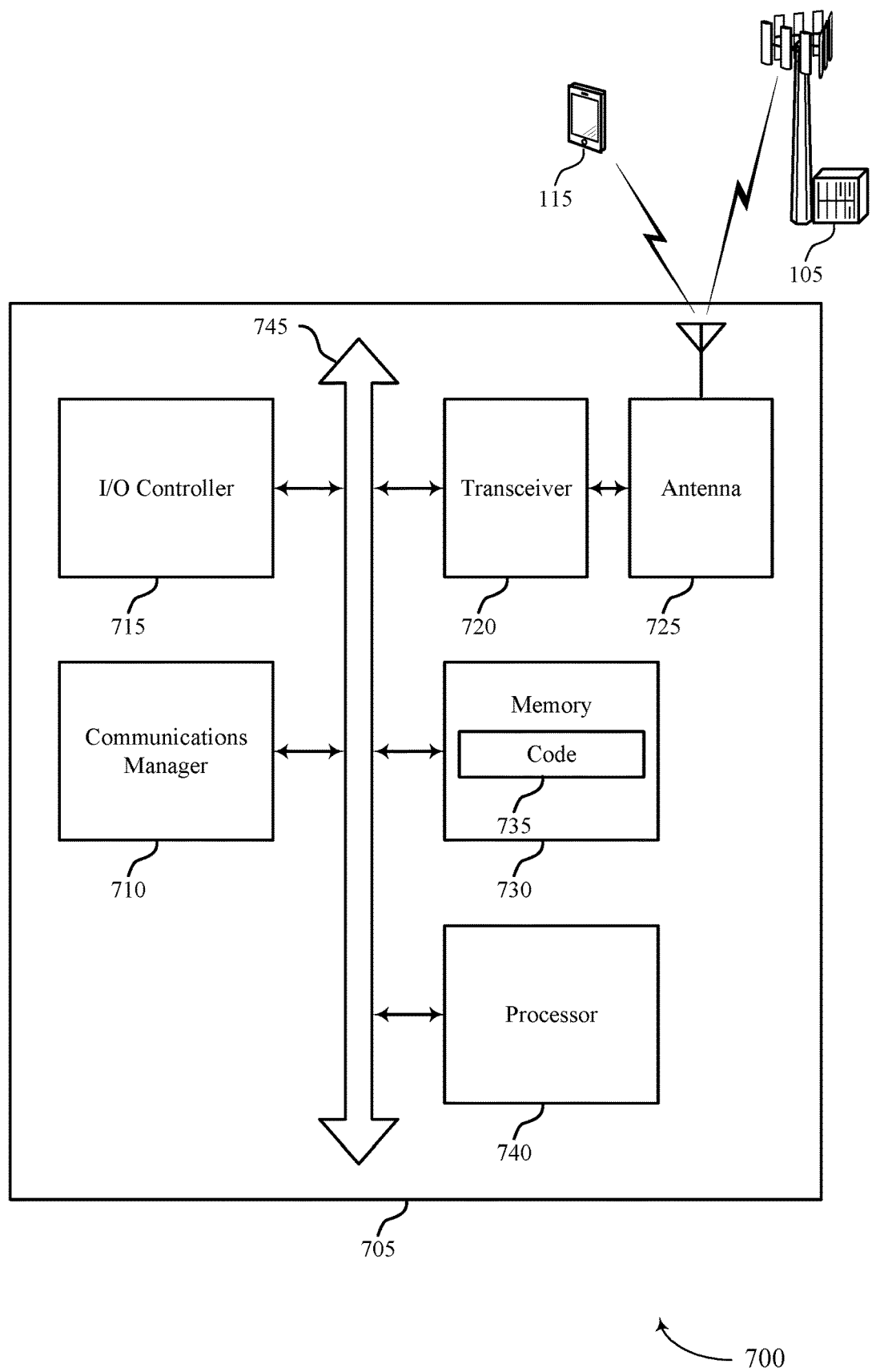
FIG. 7 shows a diagram of a system including a device in accordance with aspects of the present disclosure.

FIG. 7 shows a diagram of a system 700 including a device 705 in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710. These components may be in electronic communication via one or more buses (e.g., bus).

The communications manager 710 may receive control signaling indicating a resource allocation for a sidelink channel, receive, from a base station, a control message that indicates the QCL relation, the spatial relation data, or both, transmit, to a second UE via a control channel of the sidelink channel, an indication of a QCL relation, spatial relation data, or both, for the resource allocation, and communicate with the second UE using the resource allocation for the sidelink channel based on the QCL relation, the spatial relation data, or both. In some examples, the communications manager 710 may also receive control signaling indicating a resource allocation for a sidelink channel, receive, via a control channel of the sidelink channel, an indication of a network-provided configuration including a QCL relation, spatial relation data, or both, from a second UE for the resource allocation, and communicate with the second UE using the resource allocation for the sidelink channel based on the QCL relation, the spatial relation data, or both.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touch-screen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting signaling of beam information for sidelink operations).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
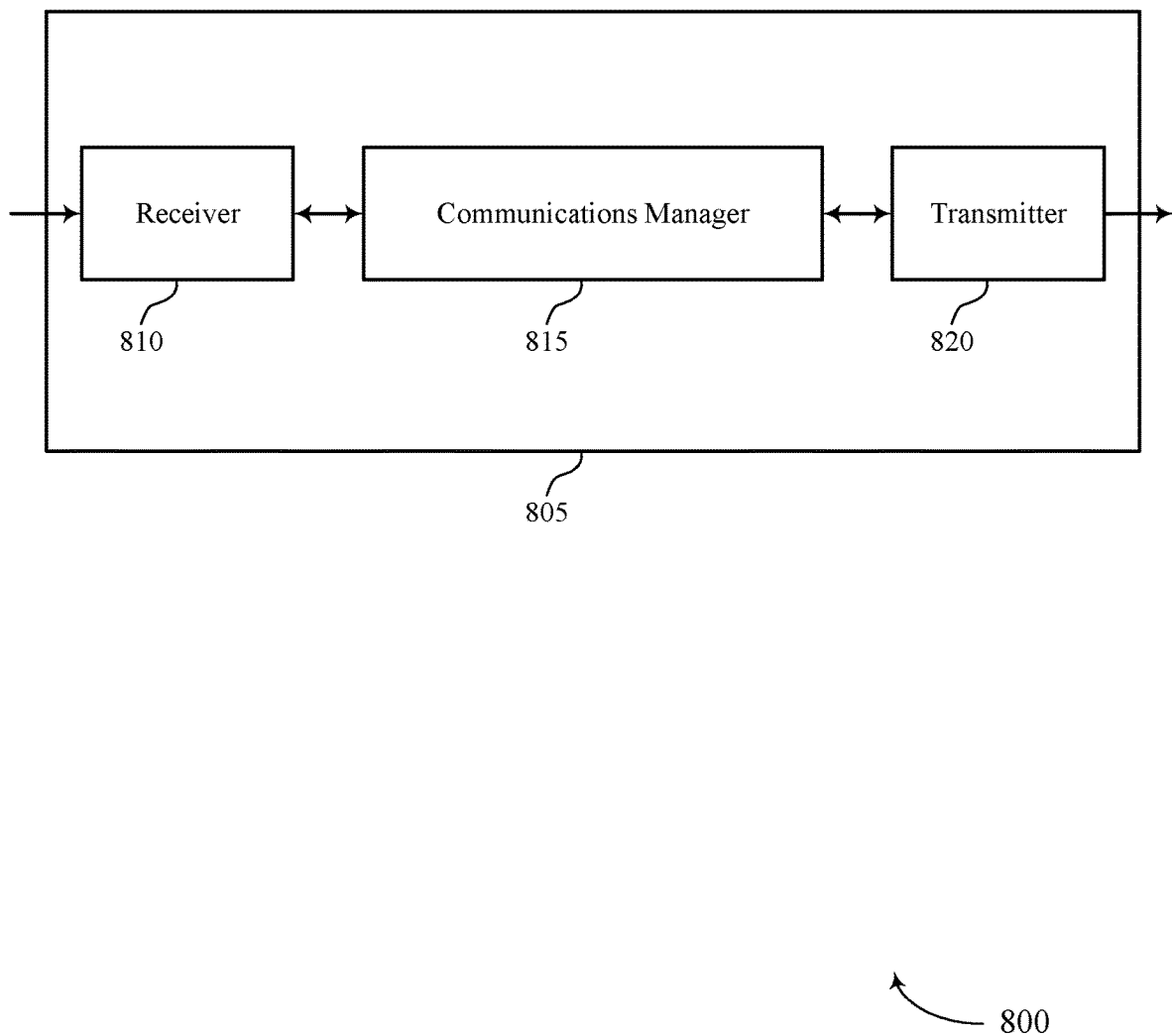
FIGS. 8 and 9 show block diagrams of devices in accordance with aspects of the present disclosure.

FIG. 8 shows a block diagram 800 of a device 805 in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to signaling for sidelink beam operation, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit control signaling indicating a resource allocation for a sidelink channel between a first UE and a second UE and transmit, to the first UE, a control message including an indication of a QCL relation, spatial relation data, or both, to apply when communicating via the resource allocation for the sidelink channel. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
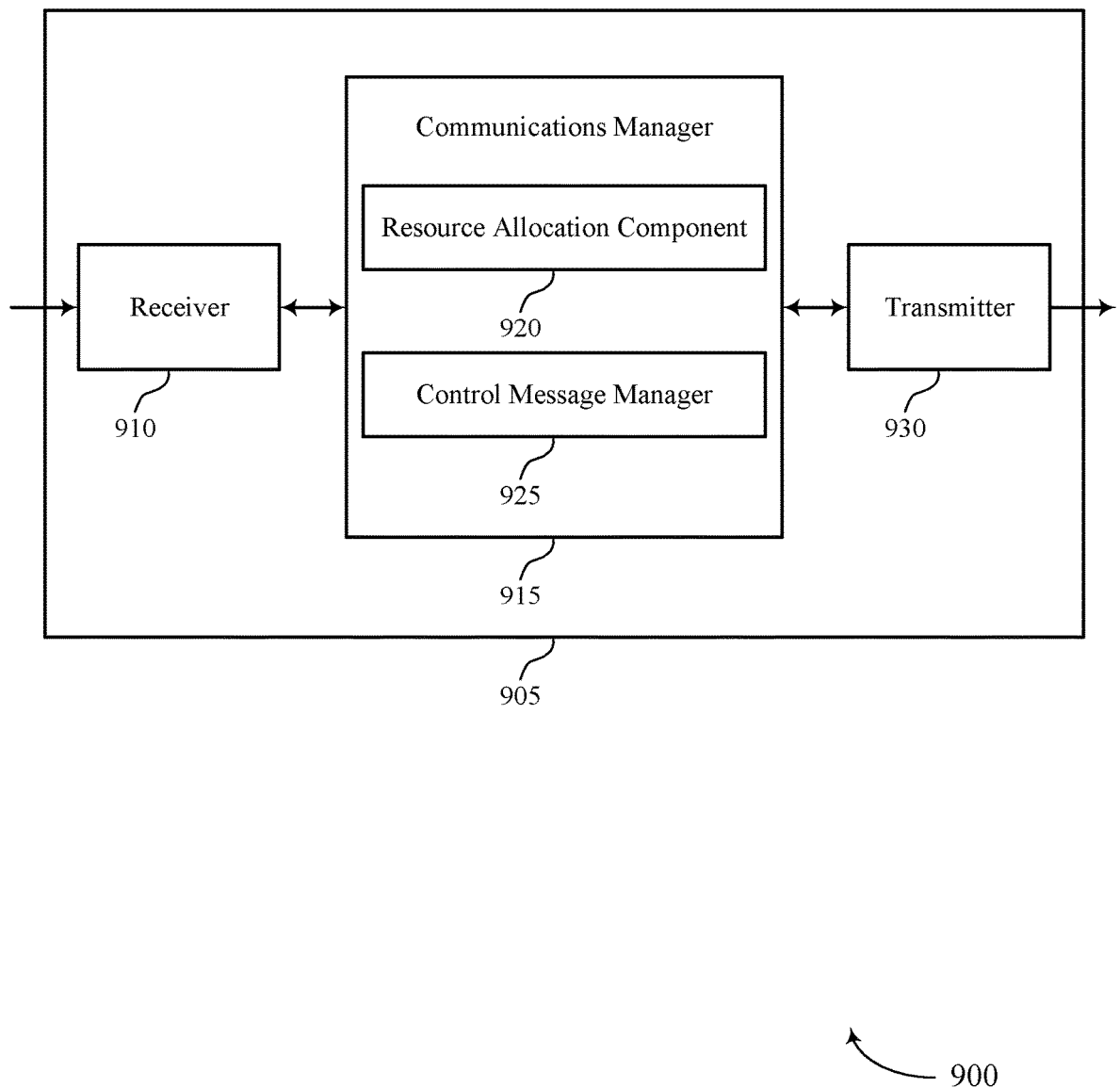

FIG. 9 shows a block diagram 900 of a device 905 in accordance with aspects of the present disclosure. The device 905 may be an example of aspects of a device 805, or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to signaling for sidelink beam operation, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a resource allocation component 920 and a control message manager 925. The communications manager 915 may be an example of aspects of the communications manager 1110 described herein.

The resource allocation component 920 may transmit control signaling indicating a resource allocation for a sidelink channel between a first UE and a second UE. The control message manager 925 may transmit, to the first UE, a control message including an indication of a QCL relation, spatial relation data, or both, to apply when communicating via the resource allocation for the sidelink channel.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
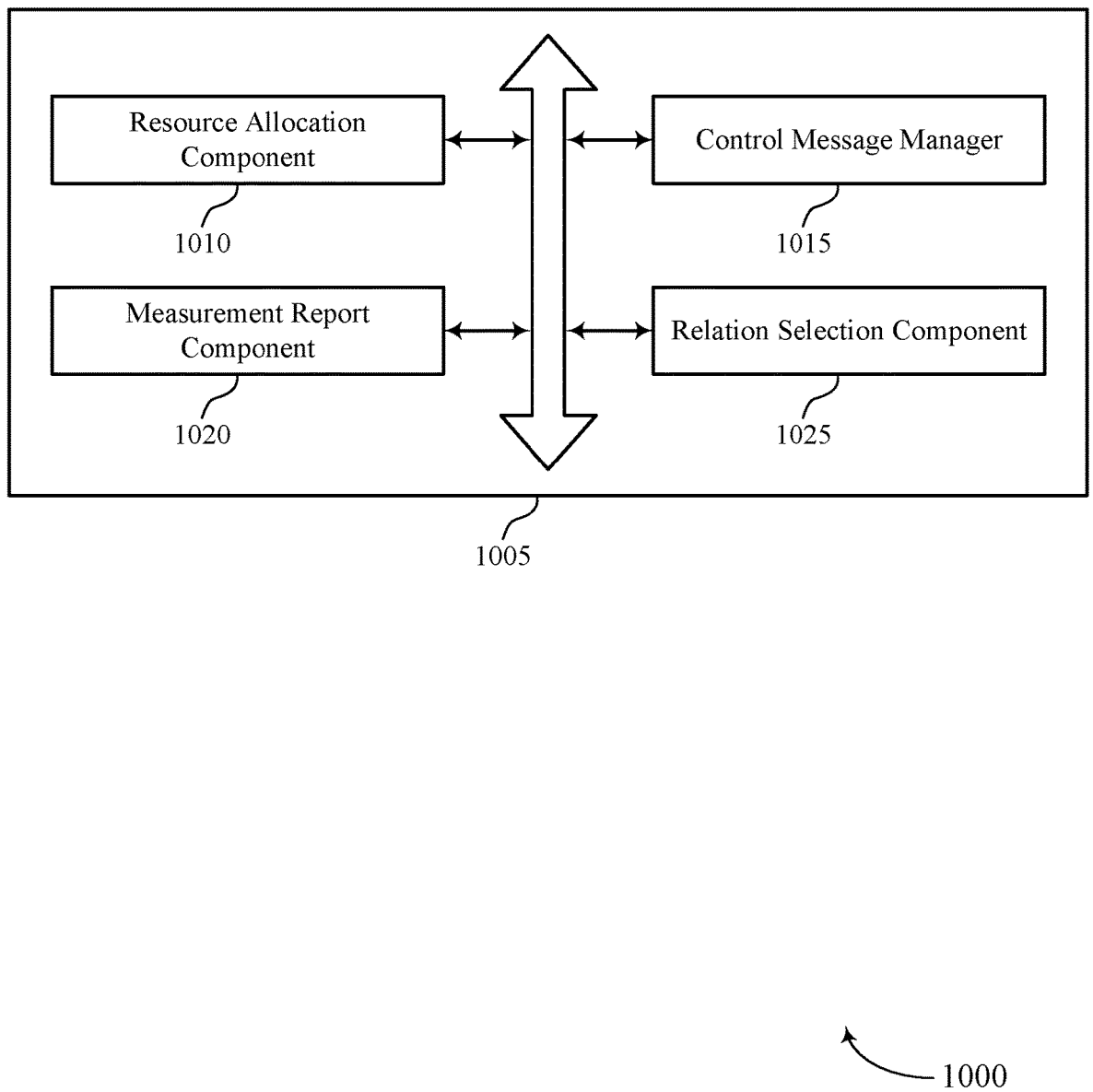
FIG. 10 shows a block diagram of a communications manager in accordance with aspects of the present disclosure.

FIG. 10 shows a block diagram 1000 of a communications manager 1005 in accordance with aspects of the present disclosure. The communications manager 1005 may be an example of aspects of a communications manager 815, a communications manager 915, or a communications manager 1110 described herein. The communications manager 1005 may include a resource allocation component 1010, a control message manager 1015, a measurement report component 1020, and a relation selection component 1025. Each of these modules may communicate, directly or indirectly, with one another (e.g., via one or more buses).

The resource allocation component 1010 may transmit control signaling indicating a resource allocation for a sidelink channel between a first UE and a second UE. The control message manager 1015 may transmit, to the first UE, a control message including an indication of a QCL relation, spatial relation data, or both, to apply when communicating via the resource allocation for the sidelink channel. In some examples, the control message manager 1015 may transmit the control message including a set of different QCL relations, a set of different spatial relation data, or both. In some cases, the QCL relation indicates an omni beam, a wide beam, a narrow beam, or any combination thereof. In some cases, the spatial relation data indicates an omni beam, a wide beam, a narrow beam, or any combination thereof.

The measurement report component 1020 may receive, from the first UE or the second UE, a measurement report. In some examples, the measurement report component 1020 may receive, from the first UE, a first measurement report. In some examples, the measurement report component 1020 may receive, from the second UE, a second measurement report. In some cases, the measurement report indicates at least one beam index and at least one beam measurement.

The relation selection component 1025 may select the QCL relation, the spatial relation data, or both, based on the measurement report. In some examples, the relation selection component 1025 may select the QCL relation, the spatial relation data, or both, based on the first measurement report and the second measurement report.

Figure 11:
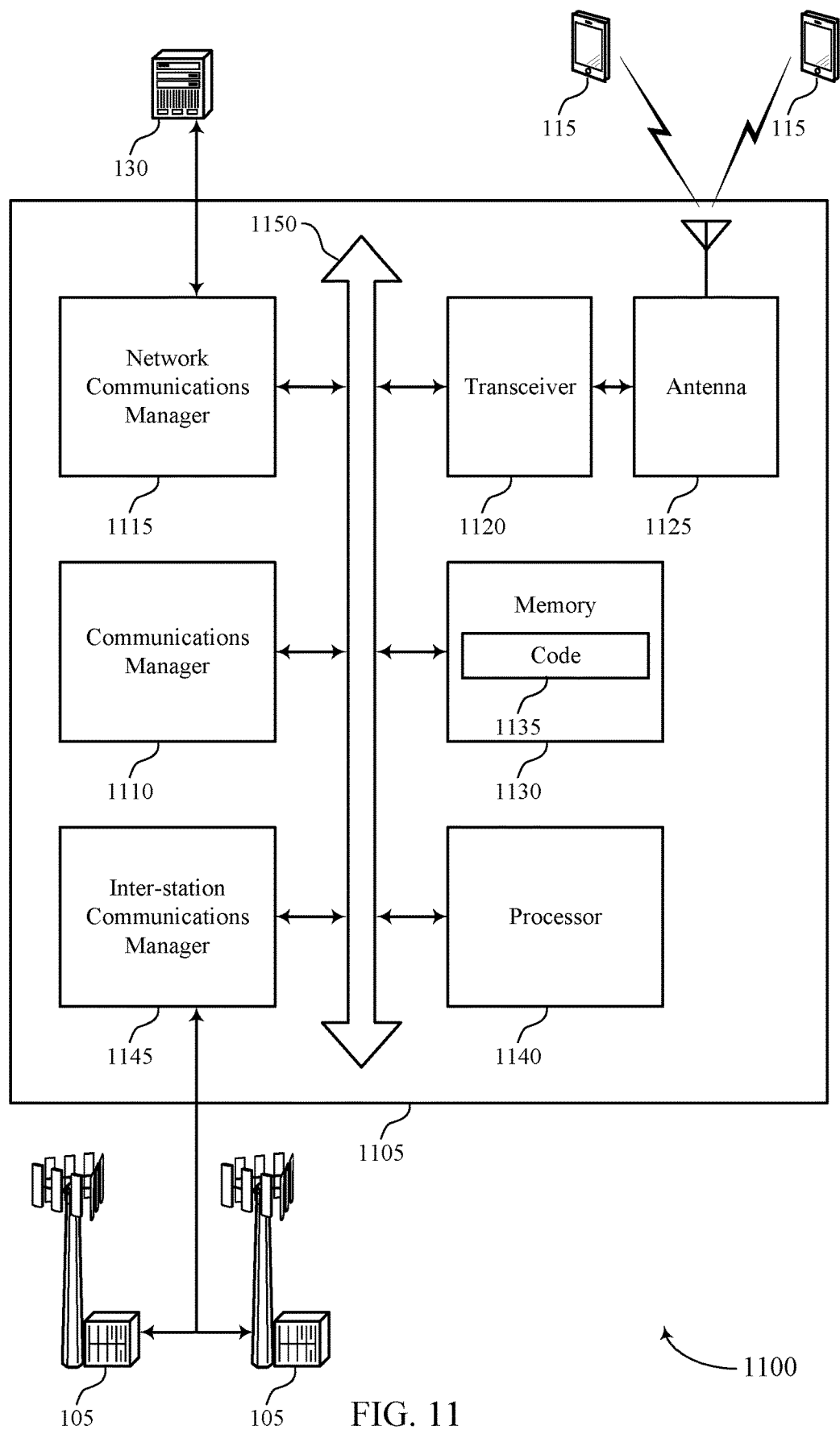
FIG. 11 shows a diagram of a system including a device in accordance with aspects of the present disclosure.

FIG. 11 shows a diagram of a system 1100 including a device 1105 in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit control signaling indicating a resource allocation for a sidelink channel between a first UE and a second UE and transmit, to the first UE, a control message including an indication of a QCL relation, spatial relation data, or both, to apply when communicating via the resource allocation for the sidelink channel.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting signaling for sidelink beam operation).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
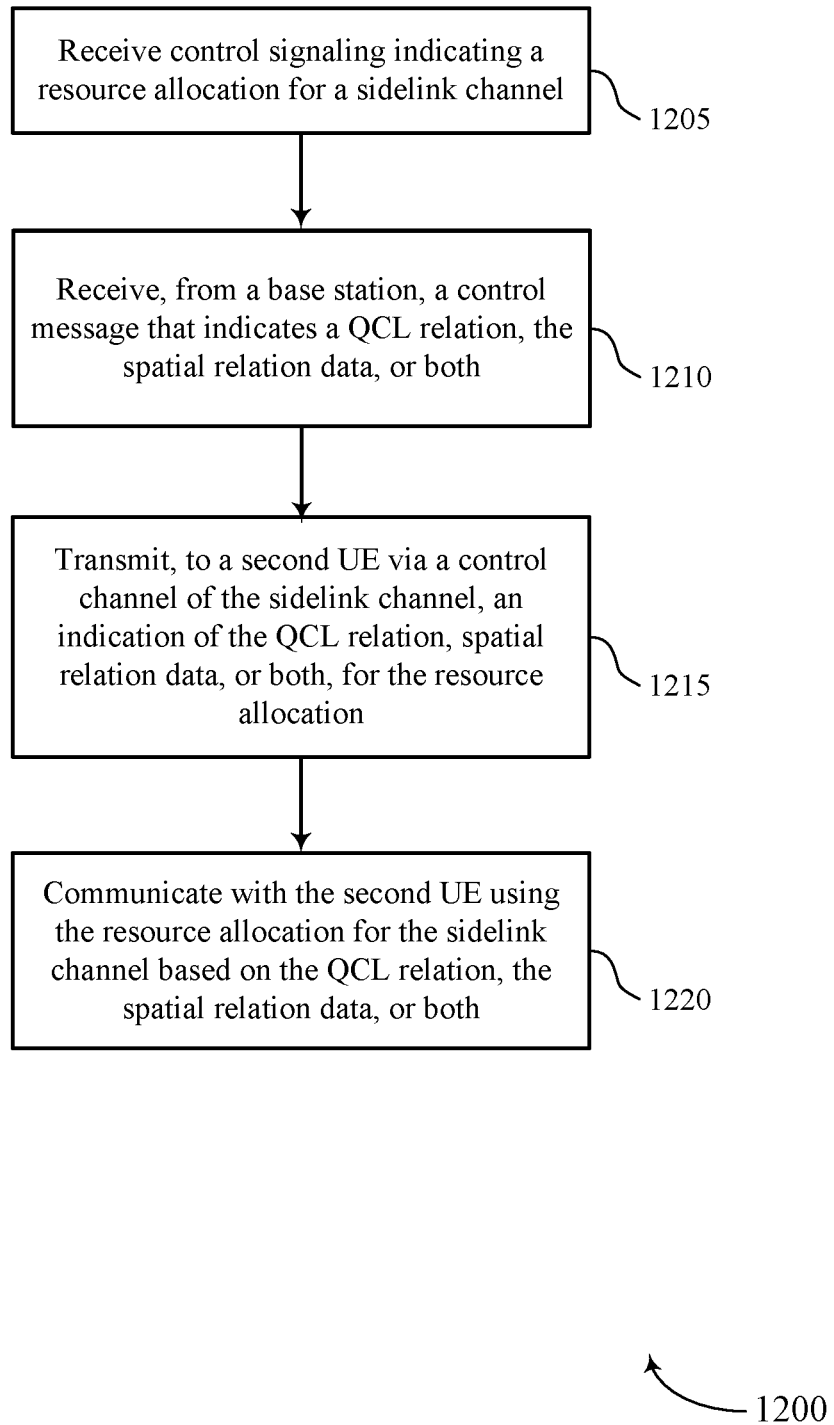
FIGS. 12 through 15 show flowcharts illustrating methods in accordance with aspects of the present disclosure.

FIG. 12 shows a flowchart illustrating a method 1200 in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may receive control signaling indicating a resource allocation for a sidelink channel. The operations of 1205 may be performed according to the methods described herein. In some examples, aspects of the operations of 1205 may be performed by a control signaling component as described with reference to FIGS. 4 through 7.

At 1210, the UE may receive, from a base station, a control message that indicates the QCL relation, the spatial relation data, or both. The operations of 1210 may be performed according to the methods described herein. In some examples, aspects of the operations of 1210 may be performed by a control signaling component as described with reference to FIGS. 4 through 7.

At 1215, the UE may transmit, to a second UE via a control channel of the sidelink channel, an indication of a QCL relation, spatial relation data, or both, for the resource allocation. The operations of 1215 may be performed according to the methods described herein. In some examples, aspects of the operations of 1215 may be performed by an indication component as described with reference to FIGS. 4 through 7.

At 1220, the UE may communicate with the second UE using the resource allocation for the sidelink channel based on the QCL relation, the spatial relation data, or both. The operations of 1220 may be performed according to the methods described herein. In some examples, aspects of the operations of 1220 may be performed by a communication component as described with reference to FIGS. 4 through 7.

Figure 13:
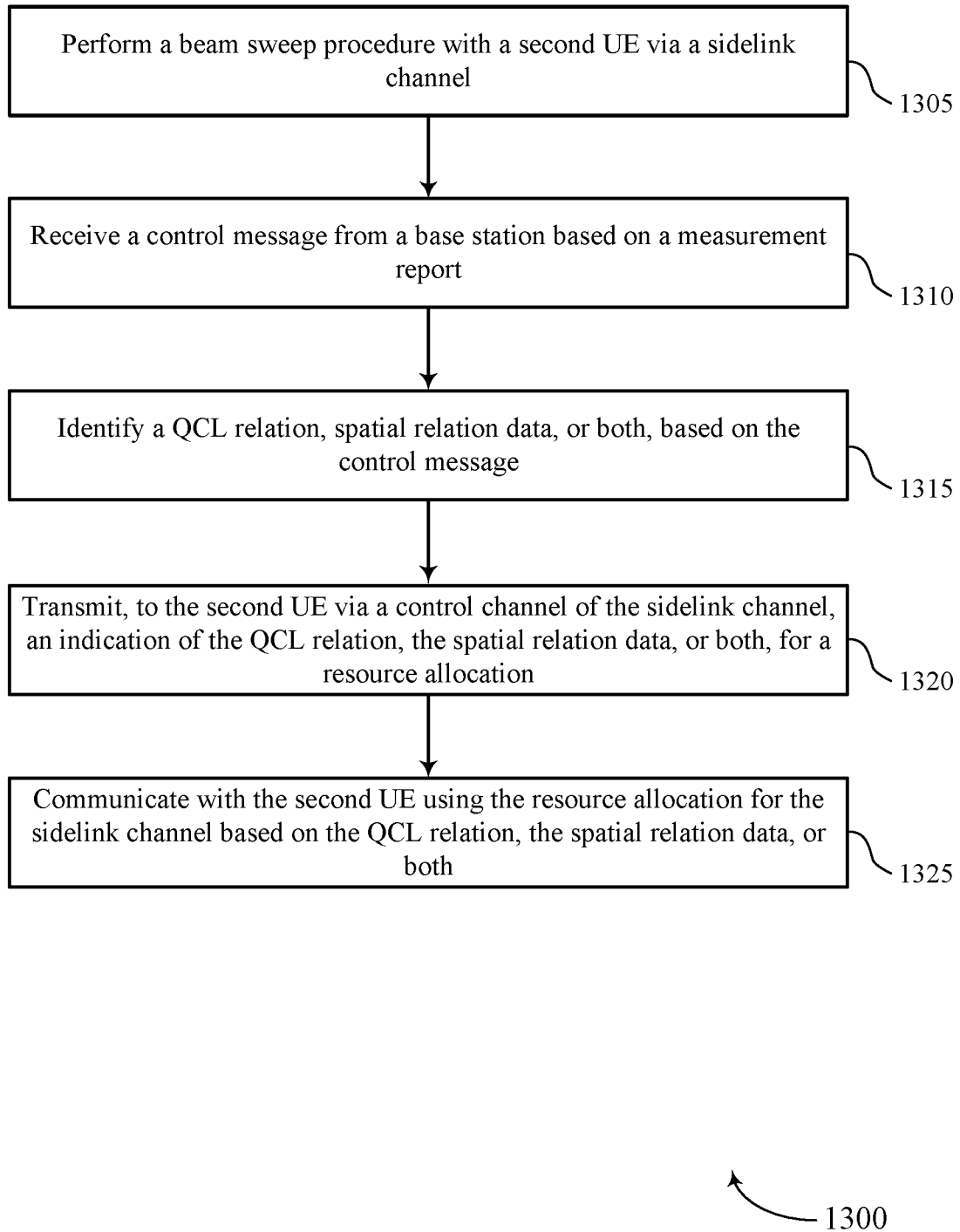

FIG. 13 shows a flowchart illustrating a method 1300 in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may perform a beam sweep procedure with a second UE via a sidelink channel. The operations of 1305 may be performed according to the methods described herein. In some examples, aspects of the operations of 1305 may be performed by a beam sweep manager as described with reference to FIGS. 4 through 7.

At 1310, the UE may receive a control message from the base station based on a measurement report. The operations of 1310 may be performed according to the methods described herein. In some examples, aspects of the operations of 1310 may be performed by a control signaling component as described with reference to FIGS. 4 through 7.

At 1315, the UE may identify a QCL relation, spatial relation data, or both, based on the control message. The operations of 1315 may be performed according to the methods described herein. In some examples, aspects of the operations of 1315 may be performed by a relation manager as described with reference to FIGS. 4 through 7.

At 1320, the UE may transmit, to the second UE via a control channel of the sidelink channel, an indication of the QCL relation, the spatial relation data, or both, for the resource allocation. The operations of 1320 may be performed according to the methods described herein. In some examples, aspects of the operations of 1320 may be performed by an indication component as described with reference to FIGS. 4 through 7.

At 1325, the UE may communicate with the second UE using the resource allocation for the sidelink channel based on the QCL relation, the spatial relation data, or both. The operations of 1325 may be performed according to the methods described herein. In some examples, aspects of the operations of 1325 may be performed by a communication component as described with reference to FIGS. 4 through 7.

Figure 14:
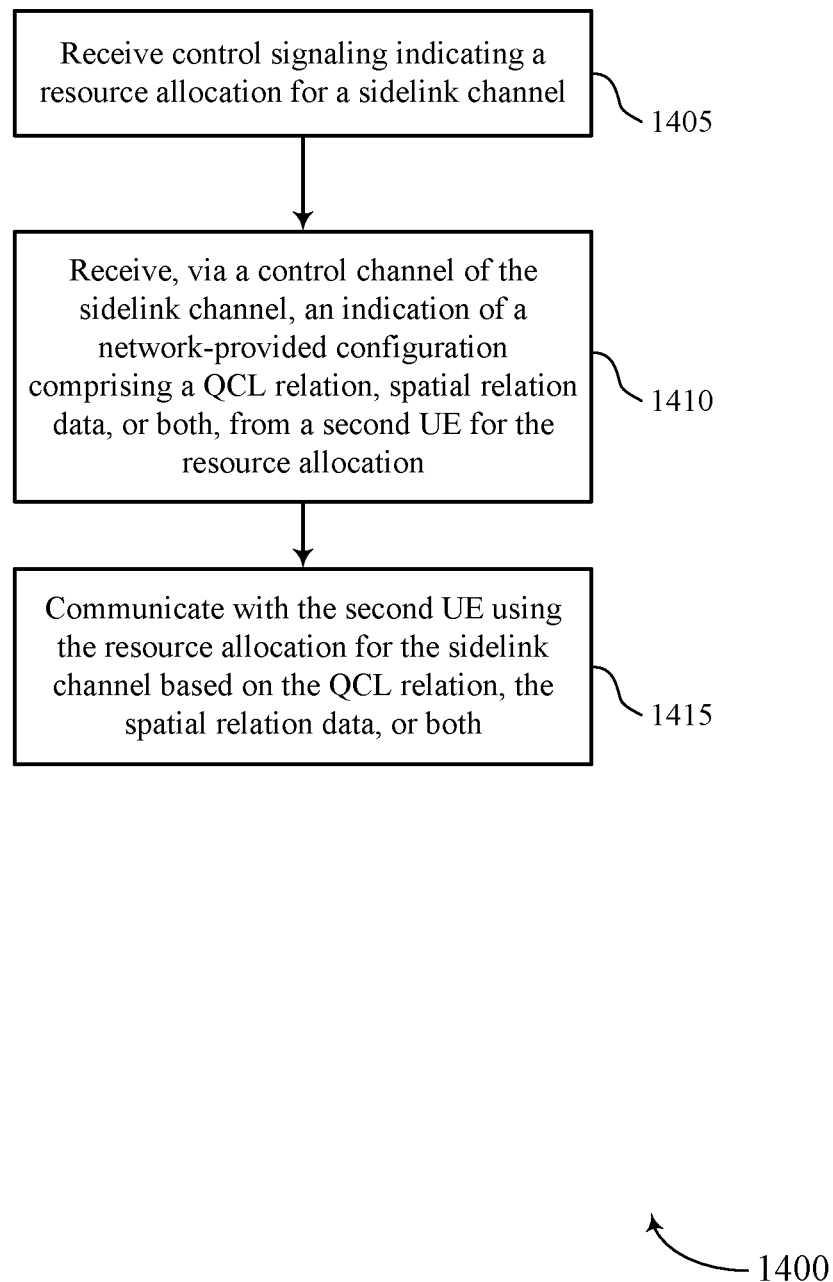

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may receive control signaling indicating a resource allocation for a sidelink channel. The operations of 1405 may be performed according to the methods described herein. In some examples, aspects of the operations of 1405 may be performed by a control signaling component as described with reference to FIGS. 4 through 7.

At 1410, the UE may receive, via a control channel of the sidelink channel, an indication of a network-provided configuration including a QCL relation, spatial relation data, or both, from a second UE for the resource allocation. The operations of 1410 may be performed according to the methods described herein. In some examples, aspects of the operations of 1410 may be performed by an indication component as described with reference to FIGS. 4 through 7.

At 1415, the UE may communicate with the second UE using the resource allocation for the sidelink channel based on the QCL relation, the spatial relation data, or both. The operations of 1415 may be performed according to the methods described herein. In some examples, aspects of the operations of 1415 may be performed by a communication component as described with reference to FIGS. 4 through 7.

Figure 15:
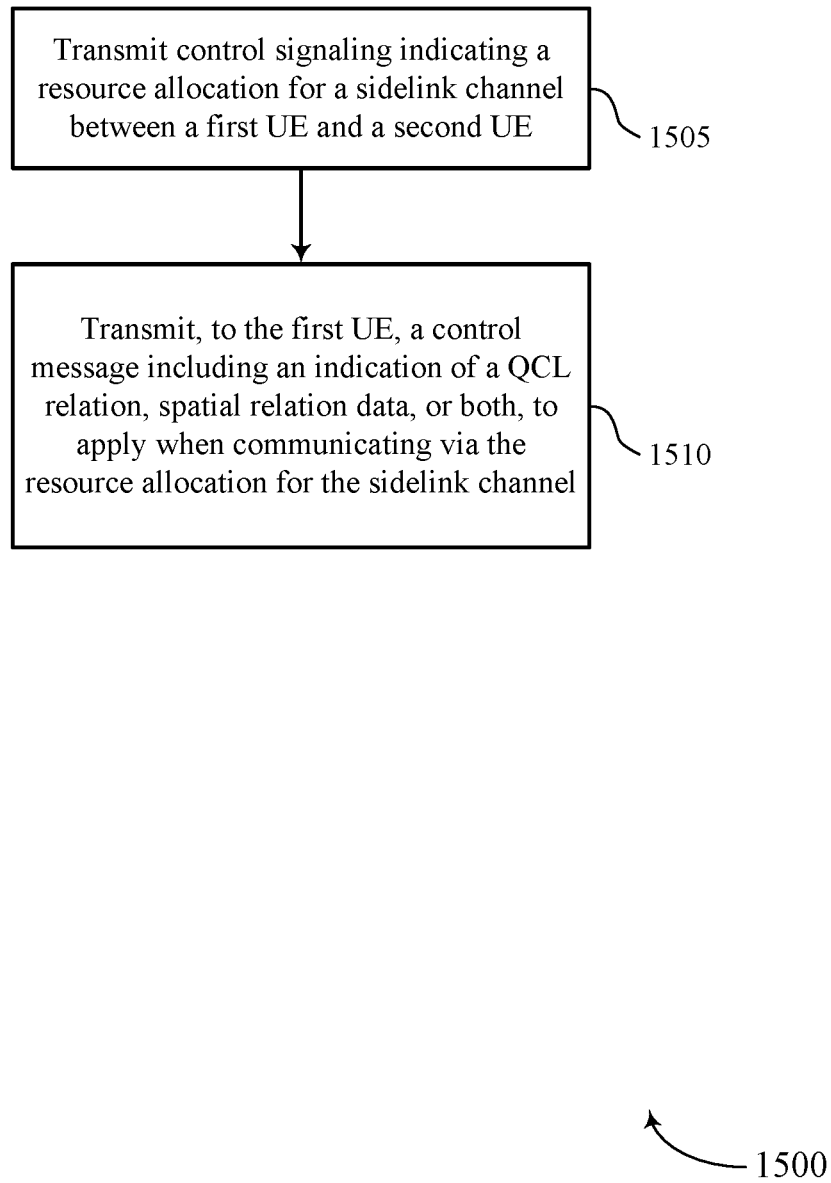

FIG. 15 shows a flowchart illustrating a method 1500 in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may transmit control signaling indicating a resource allocation for a sidelink channel between a first UE and a second UE. The operations of 1505 may be performed according to the methods described herein. In some examples, aspects of the operations of 1505 may be performed by a resource allocation component as described with reference to FIGS. 8 through 11.

At 1510, the base station may transmit, to the first UE, a control message including an indication of a QCL relation, spatial relation data, or both, to apply when communicating via the resource allocation for the sidelink channel. The operations of 1510 may be performed according to the methods described herein. In some examples, aspects of the operations of 1510 may be performed by a control message manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a first user equipment (UE), comprising:
   receiving control signaling indicating a resource allocation for a sidelink channel;
   receiving, from a network node, a control message that indicates a quasi co-location (QCL) relation, spatial relation data, or both;
   transmitting, to a second UE via a control channel of the sidelink channel, an indication of the QCL relation, the spatial relation data, or both, for the resource allocation;
   communicating with the second UE using the resource allocation for the sidelink channel based at least in part on the QCL relation, the spatial relation data, or both;
   performing a beam management procedure with the second UE via the sidelink channel; and
   communicating with the second UE using the resource allocation for the sidelink channel based at least in part on an updated QCL relation, updated spatial relation data, or both, the updated QCL relation, the updated spatial relation data, or both being based at least in part on the beam management procedure.

2. The method of claim 1, wherein communicating with the second UE via the sidelink channel comprises:
   transmitting, via a beam corresponding to the QCL relation, a data transmission or a control transmission to the second UE via the sidelink channel.

3. The method of claim 1, wherein communicating with the second UE via the sidelink channel comprises:
   receiving, via a beam corresponding to the spatial relation data, a data transmission or a control transmission from the second UE via the sidelink channel.

4. The method of claim 1, further comprising:
   performing a beam sweep procedure with the second UE via the sidelink channel;
   transmitting a measurement report to the network node based at least in part on the beam sweep procedure; and
   receiving the control message from the network node based at least in part on the measurement report.

5. The method of claim 4, wherein the measurement report indicates a beam index, a signal strength measurement, or both, for at least one beam measured during the beam sweep procedure.

6. The method of claim 5, further comprising:
receiving, from the network node, a set of different QCL relations, wherein the indication of the QCL relation indicates first QCL relation from the set of different QCL relations.

7. The method of claim 6, further comprising:
transmitting, via the control channel, a second indication of a second QCL relation from the set of different QCL relations; and
transmitting, via a beam corresponding to the second QCL relation, a data transmission or a control transmission to the second UE via the sidelink channel.

8. The method of claim 1, further comprising:
receiving, from the network node, a set of different spatial relation data, wherein the indication of the spatial relation data indicates first spatial relation data from the set of different spatial relation data.

9. The method of claim 8, further comprising:
transmitting, via the control channel, a second indication of second spatial relation data from the set of different spatial relation data; and
receiving, via a beam corresponding to the second spatial relation data, a data transmission from the second UE via the sidelink channel.

10. The method of claim 1, further comprising:
performing a beam sweep procedure with the second UE via the sidelink channel; and
identifying at least one beam based at least in part on the beam sweep procedure, wherein the QCL relation, the spatial relation data, or both, corresponds to the at least one beam.

11. The method of claim 1, wherein the QCL relation indicates an omni beam, a wide beam, a narrow beam, or any combination thereof.

12. The method of claim 1, wherein the spatial relation data indicates an omni beam, a wide beam, a narrow beam, or any combination thereof.

13. The method of claim 1, wherein the resource allocation is scheduled by the network node or is a resource pool that is configured or signaled.

14. A method for wireless communications by a first user equipment (UE), comprising:
receiving control signaling indicating a resource allocation for a sidelink channel;
receiving, via a control channel of the sidelink channel, an indication of a network-provided configuration comprising a quasi co-location (QCL) relation, spatial relation data, or both, from a second UE for the resource allocation;
communicating with the second UE using the resource allocation for the sidelink channel based at least in part on the QCL relation, the spatial relation data, or both;
performing a beam management procedure with the second UE via the sidelink channel; and
communicating with the second UE using the resource allocation for the sidelink channel based at least in part on an updated QCL relation, updated spatial relation data, or both, the updated QCL relation, the updated spatial relation data, or both being based at least in part on the beam management procedure.

15. The method of claim 14, wherein communicating with the second UE via the sidelink channel comprises:
receiving, via a beam corresponding to the QCL relation, a data transmission or a control transmission from the second UE via the sidelink channel.

16. The method of claim 14, wherein communicating with the second UE via the sidelink channel comprises:
transmitting, via a beam corresponding to the spatial relation data, a data transmission to the second UE via the sidelink channel based at least in part on the spatial relation data.

17. The method of claim 14, further comprising:
performing a beam sweep procedure with the second UE via the sidelink channel; and
transmitting, to the second UE, a beam index and a beam measurement based at least in part on the beam sweep procedure.

18. The method of claim 14, further comprising:
performing a beam sweep procedure with the second UE via the sidelink channel; and
transmitting a measurement report to a network node based at least in part on the beam sweep procedure.

19. The method of claim 18, wherein the measurement report indicates a beam index, a signal strength measurement, or both, for at least one beam measured during the beam sweep procedure.

20. The method of claim 14, further comprising:
receiving, via the control channel, a second network-provided indication of a second QCL relation, second spatial relation data, or both; and
communicating with the second UE via the sidelink channel based at least in part on the second QCL relation, the second spatial relation data, or both.

21. The method of claim 14, wherein the QCL relation indicates an omni beam, a wide beam, a narrow beam, or any combination thereof.

22. The method of claim 14, wherein the spatial relation data indicates an omni beam, a wide beam, a narrow beam, or any combination thereof.

23. A method for wireless communications by a network node, comprising:
receiving, from a first user equipment (UE) or a second UE, or both, one or more measurement reports;
transmitting control signaling indicating a resource allocation for a sidelink channel between the first UE and the second UE; and
transmitting, to the first UE, a control message comprising an indication of a geographic pointing direction, or a beam width, or both, associated with a communication beam for use by the first UE, the second UE, or both, when communicating via the resource allocation for the sidelink channel and an indication of a QCL relation, spatial relation data, or both, to apply when communicating via the resource allocation for the sidelink channel,
the QCL relation, spatial relation data, or both being based at least in part on the one or more measurement reports.

24. The method of claim 23, wherein the measurement report indicates at least one beam index and at least one beam measurement.

25. The method of claim 23, wherein receiving the one or more measurement reports comprises:
receiving, from the first UE, a first measurement report;
receiving, from the second UE, a second measurement report;
wherein the QCL relation, the spatial relation data, or both, are based at least in part on the first measurement report and the second measurement report.

26. The method of claim 23, wherein the QCL relation or the spatial relation data indicates an omni beam, a wide beam, a narrow beam, or any combination thereof.

27. An apparatus for wireless communications by a first user equipment (UE), comprising:
- a transceiver;
- a processor;
- memory coupled with the processor; and
- instructions stored in the memory and executable by the processor to cause the apparatus to:
    - receive, via the transceiver, control signaling indicating a resource allocation for a sidelink channel;
    - receive, from a network node via the transceiver, a control message that indicates a quasi co-location (QCL) relation, spatial relation data, or both;
    - transmit, via the transceiver to a second UE over a control channel of the sidelink channel, an indication of the QCL relation, the spatial relation data, or both, for the resource allocation;
    - communicate, via the transceiver, with the second UE using the resource allocation for the sidelink channel based at least in part on the QCL relation, the spatial relation data, or both;
    - perform a beam management procedure with the second UE via the sidelink channel; and
    - communicate with the second UE using the resource allocation for the sidelink channel based at least in part on an updated QCL relation, updated spatial relation data, or both, the updated QCL relation, the updated spatial relation data, or both being based at least in part on the beam management procedure.

28. The apparatus of claim 27, wherein the instructions to communicate with the second UE via the sidelink channel are executable by the processor to cause the apparatus to:
- transmit, via the transceiver using a beam corresponding to the QCL relation, a data transmission or a control transmission to the second UE via the sidelink channel.

* * * * *